(12) United States Patent
Jones et al.

(10) Patent No.: US 7,208,945 B2
(45) Date of Patent: Apr. 24, 2007

(54) SENSING APPARATUS AND METHOD

(75) Inventors: Ross Peter Jones, Cambridge (GB);
Richard Alan Doyle, Greenside (ZA);
Mark Anthony Howard, Worlington (GB); David Alun James, Harston (GB); Darran Kriet, Foxton (GB);
Colin Stuart Sills, Cambridge (GB)

(73) Assignee: TT Electronics Technology Limited (GB)

( * ) Notice: Subject to any disclaimer, the term of this patent is extended or adjusted under 35 U.S.C. 154(b) by 199 days.

(21) Appl. No.: 10/492,646

(22) PCT Filed: Mar. 14, 2002

(86) PCT No.: PCT/GB02/01204

§ 371 (c)(1),
(2), (4) Date: Oct. 12, 2004

(87) PCT Pub. No.: WO03/038379

PCT Pub. Date: May 8, 2003

(65) Prior Publication Data

US 2005/0030010 A1    Feb. 10, 2005

(30) Foreign Application Priority Data

Oct. 30, 2001   (GB)   ................... 0126014.0

(51) Int. Cl.
*G01R 33/12*      (2006.01)
*G01N 27/72*      (2006.01)

(52) U.S. Cl. ............... 324/228; 324/239; 324/260; 324/244

(58) Field of Classification Search ............... 324/228, 324/239, 256, 244, 260
See application file for complete search history.

(56) References Cited

U.S. PATENT DOCUMENTS 3,275,938 A * 9/1966 Carsello et al. ............. 455/215

(Continued)

FOREIGN PATENT DOCUMENTS

EP        0 487 730        6/1992

(Continued)

*Primary Examiner*—Bot LeDynh
(74) *Attorney, Agent, or Firm*—Fogg & Powers LLC

(57) ABSTRACT

There is described a sensor comprising an excitation winding, a signal generator operable to generate an excitation signal and arranged to apply the generated excitation signal to the excitation winding, a sensor winding electromagnetically coupled to the excitation winding and a signal processor operable to process a periodic electric signal generated in the sensor winding when the excitation signal is applied to the excitation winding by the signal generator to determine a value of a sensed parameter. The excitation signal comprises a periodic carrier signal having a first frequency modulated by a periodic modulation signal having a second frequency, the first frequency being greater than the second frequency. In this way, the sensor is well suited to using digital processing techniques both to generate the excitation signal and to process the signal induced in the sensor windings. In an embodiment, the sensor is used to detect the relative position of two members. In other embodiments, the sensor is used to detect environmental factors such as temperature and humidity.

43 Claims, 13 Drawing Sheets

U.S. PATENT DOCUMENTS

| | | | |
|---|---|---|---|
| 3,772,587 | A | 11/1973 | Farrand et al. |
| 3,789,393 | A | 1/1974 | Tripp |
| 4,253,079 | A | 2/1981 | Brosh |
| 4,282,485 | A | 8/1981 | Pauwels et al. |
| 4,467,320 | A | 8/1984 | McPhee |
| 4,671,116 | A | 6/1987 | Glennon et al. |
| 4,697,144 | A | 9/1987 | Howbrook |
| 4,737,698 | A | 4/1988 | McMullin et al. |
| 4,853,666 | A | 8/1989 | Fesenmeier et al. |
| 4,893,077 | A | 1/1990 | Auchterlonie |
| 4,893,078 | A | 1/1990 | Auchterlonie |
| 4,970,450 | A | 11/1990 | Karl et al. |
| 5,023,408 | A | 6/1991 | Murakami et al. |
| 5,173,696 | A | 12/1992 | Howard et al. |
| 5,260,650 | A | 11/1993 | Schwesig et al. |
| 5,433,115 | A | 7/1995 | Spillman, Jr. et al. |
| 5,513,913 | A | 5/1996 | Ball et al. |
| 5,598,153 | A | 1/1997 | Brasseur et al. |
| 5,625,327 | A * | 4/1997 | Carroll et al. ............... 331/74 |
| 5,646,496 | A | 7/1997 | Woodland et al. |
| 5,793,202 | A | 8/1998 | Ikemoto |
| 5,793,204 | A | 8/1998 | Logue |
| 5,796,250 | A | 8/1998 | Dames |
| 5,815,091 | A | 9/1998 | Dames et al. |
| 6,124,708 | A | 9/2000 | Dames |
| 6,239,571 | B1 | 5/2001 | Shimahara |
| 6,304,014 | B1 | 10/2001 | England et al. |

FOREIGN PATENT DOCUMENTS

| | | |
|---|---|---|
| EP | 0 487 730 A1 | 6/1992 |
| GB | 2 044 461 | 10/1980 |
| GB | 2044461 A | 10/1980 |
| JP | 57-122311 | 7/1982 |
| WO | WO 98/00921 | 1/1998 |
| WO | WO 98/43046 | 10/1998 |
| WO | WO 99/34171 | 7/1999 |
| WO | WO 99/61868 | 12/1999 |
| WO | WO 00/33244 | 6/2000 |
| WO | WO 00/77480 | 12/2000 |
| WO | WO 01/29759 | 4/2001 |
| WO | WO 01/42865 | 6/2001 |

* cited by examiner

SENSING APPARATUS AND METHOD

This invention relates to a sensing apparatus and method which has particular, but not exclusive, relevance to a position sensor for sensing the relative position of two members.

Various forms of inductive sensor have been used to generate signals indicative of the position of two relatively movable members. Typically, one member carries an excitation winding and two or more sensor windings while the other member carries a resonant circuit. The magnetic coupling between the resonant circuit and each of the sensor windings varies with position so that, by applying an oscillating signal at the resonant frequency of the resonant circuit to the excitation winding, a signal is induced in each of the sensor windings which oscillates at the resonant frequency but whose amplitude varies as a function of the relative position of the two members.

International Patent Publication WO 94/25829 describes a rotary position sensor in which two excitation windings and a sensor winding are orthogonally positioned about a rotating element which includes a resonant circuit such that the magnetic coupling between each of the excitation windings and the sensor winding varies in accordance with the angular position of the rotating element. An in-phase oscillating signal and a quadrature oscillating signal (that is 90° out of phase with the in-phase oscillating signal) are respectively applied to the two excitation windings and the rotary position of the rotating element is determined from the relative amplitudes of the components of the signal induced in the sensor winding corresponding to the in-phase signal and the quadrature signal.

A problem with the rotary position sensor described in WO 94/25829 is that the processing required to derive the rotary position from the signal induced in the sensor winding is not well suited to digital processing techniques.

According to an aspect of the invention, there is provided a sensor in which a signal generator applies an excitation signal to an excitation winding, wherein the excitation signal comprises a periodic carrier signal having a carrier frequency modulated by a periodic modulation signal having a modulation frequency which is lower than the carrier frequency. Applying the excitation signal to the excitation winding induces a periodic electric signal in a sensor winding which varies in dependence upon a parameter being measured by the sensor, and a signal processor processes the induced periodic signal to determine a value representative of the parameter being measured.

By modulating the oscillating carrier signal by a lower frequency modulation signal to form the excitation signal, rather than modulating the signal induced in the sensor winding, the sensor is well suited to using digital processing techniques both to generate the excitation signal and to process the signal induced in the sensor winding.

Preferably, the signal is coupled between the excitation winding and the sensor winding via a resonator with the resonant frequency of the resonator substantially equal to the carrier frequency of the excitation signal. In this way, unwanted higher harmonics are effectively filtered out by the electromagnetic coupling between the excitation winding and the resonator.

An exemplary embodiment of the present invention will now be described with reference to the accompanying drawings in which:

FIG. 1 schematically shows a perspective view of a position sensor;

FIG. 2 schematically shows the main components of the position sensor illustrated in FIG. 1;

Figure 1:
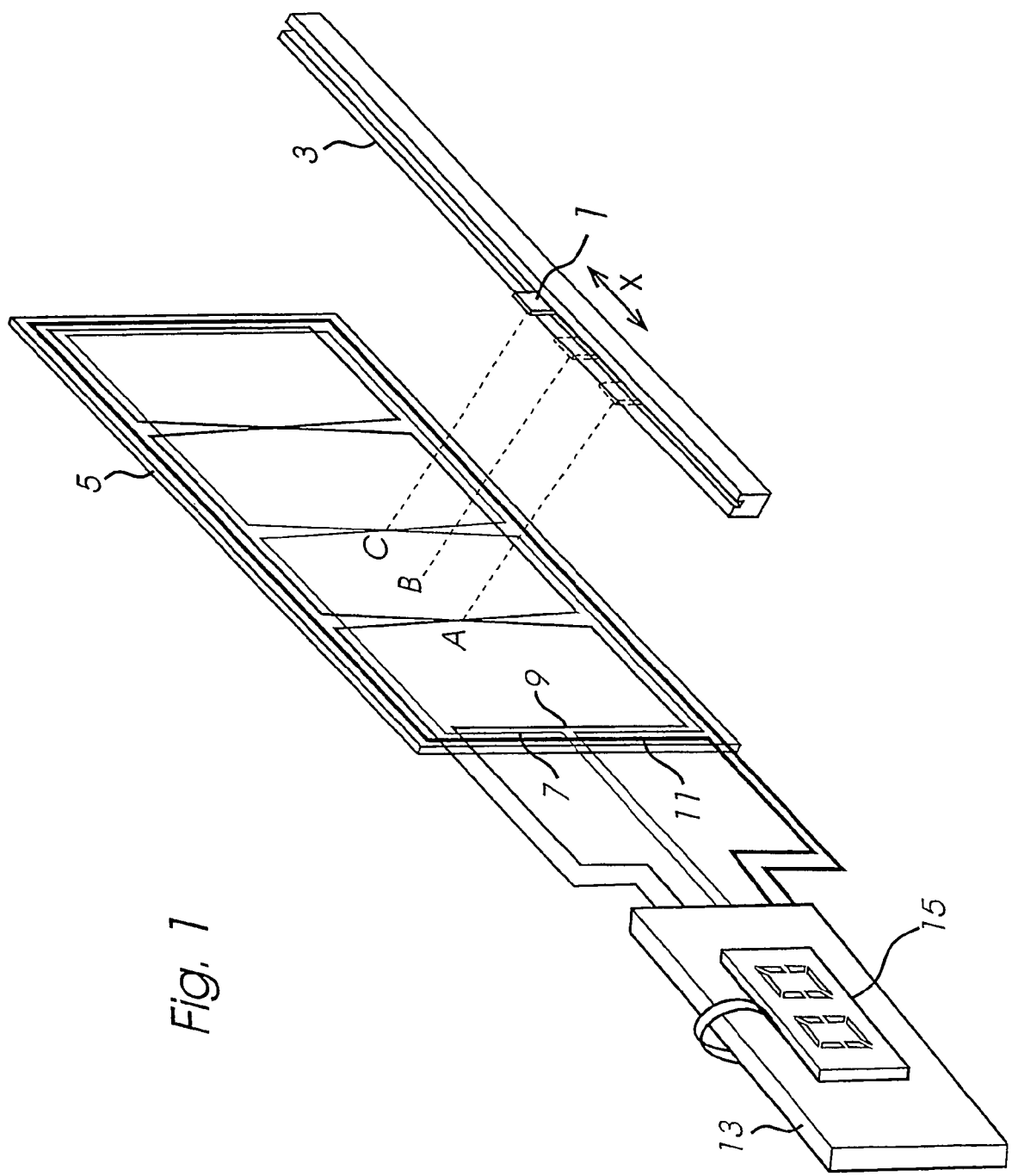
Figure 3:
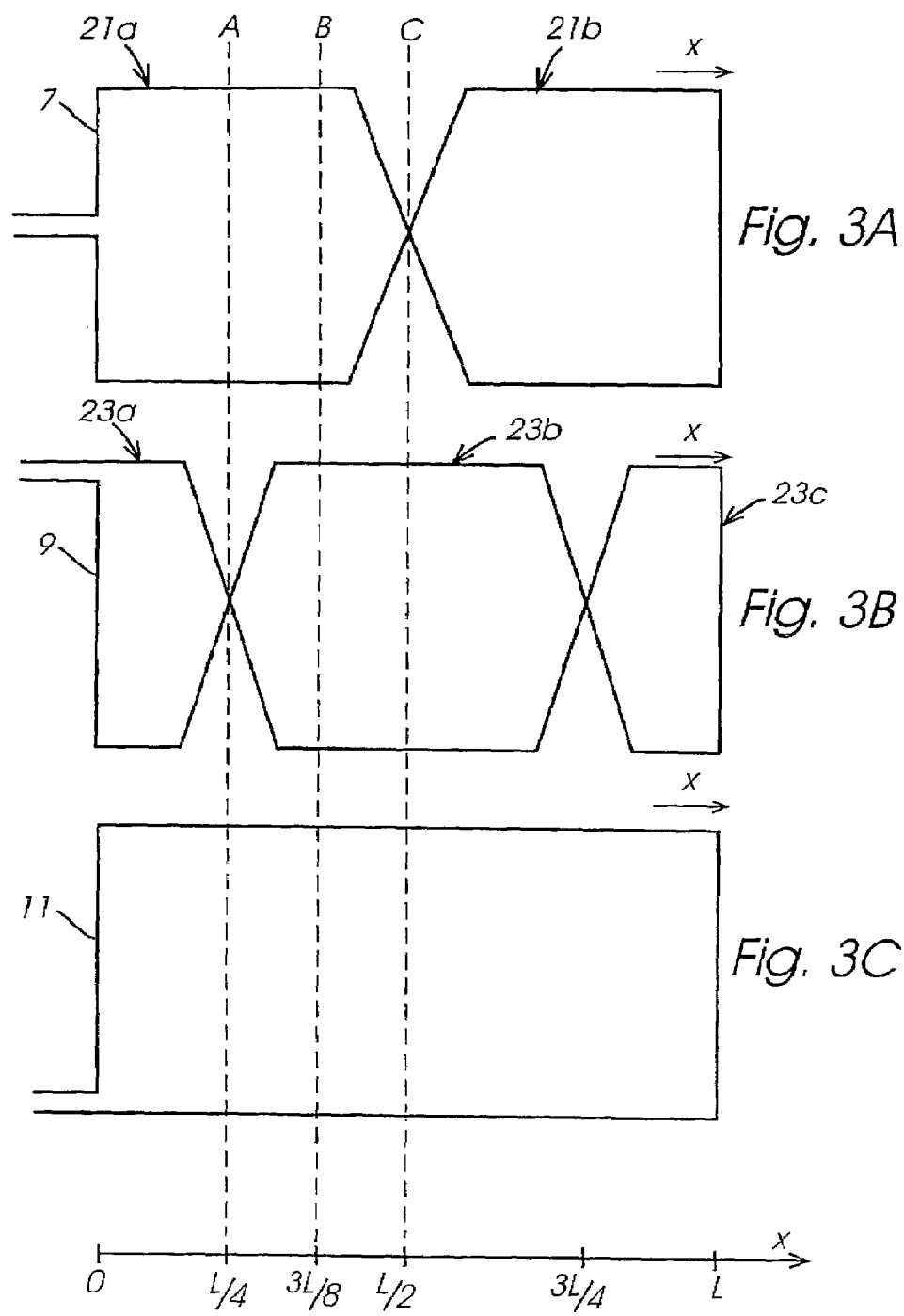
FIG. 3A shows the lay-out of a sine coil which forms part of the position sensor illustrated in FIG. 1.
FIG. 3B shows the lay-out of a cosine coil which forms part of the position sensor shown in FIG. 1.
FIG. 3C shows the lay-out of a sense coil which forms part of the position sensor illustrated in FIG. 1.
Figure 4:
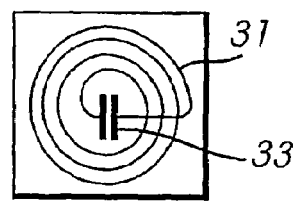
FIG. 4 shows a sensor element which forms part of the position sensor illustrated in FIG. 1.
Figure 5A:
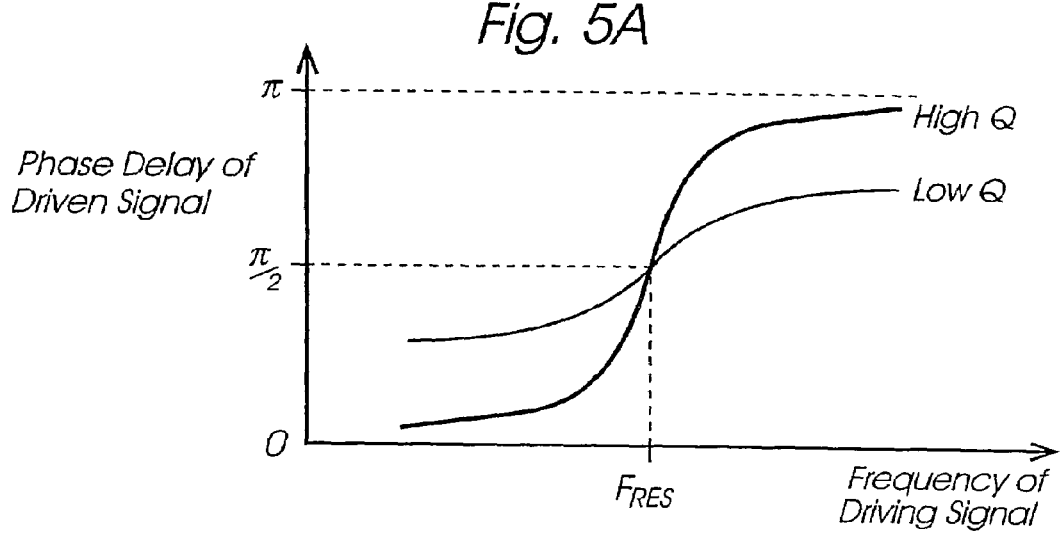
Figure 5B:
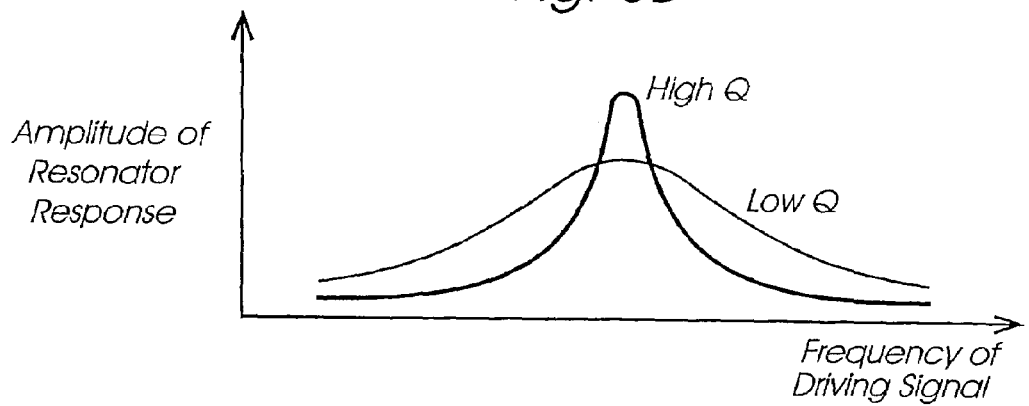
Figure 6A:
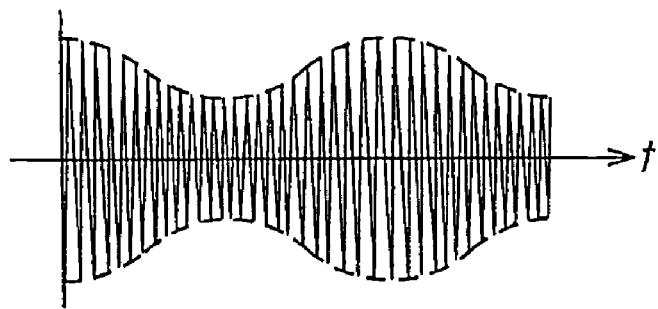
Figure 6B:
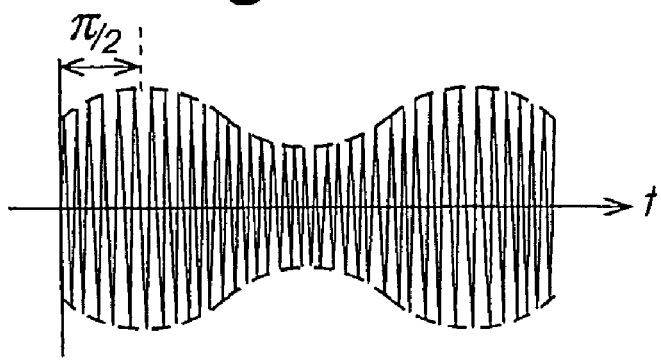
Figure 6C:
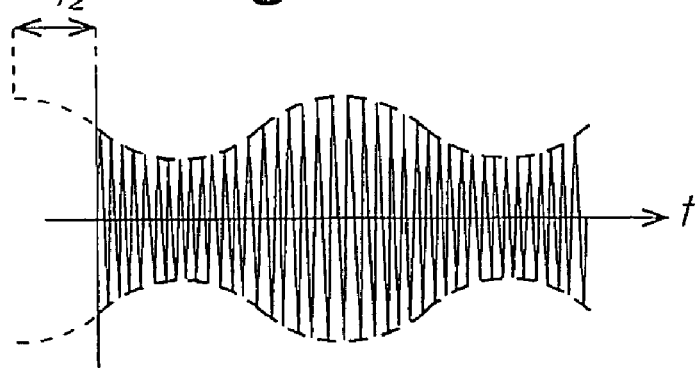
Figure 7A:
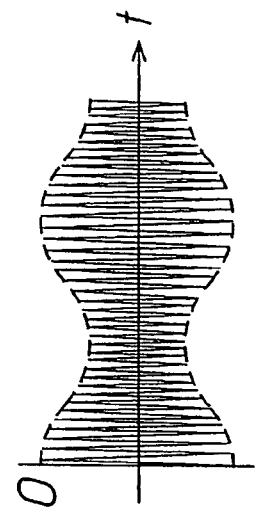
Figure 7B:
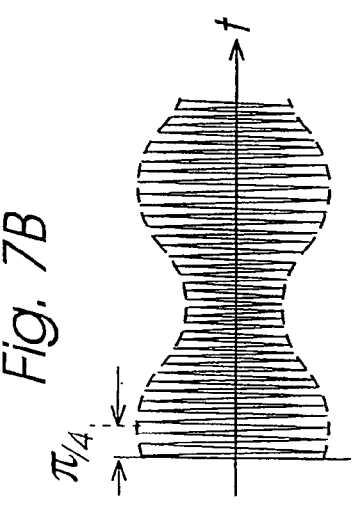
Figure 7C:
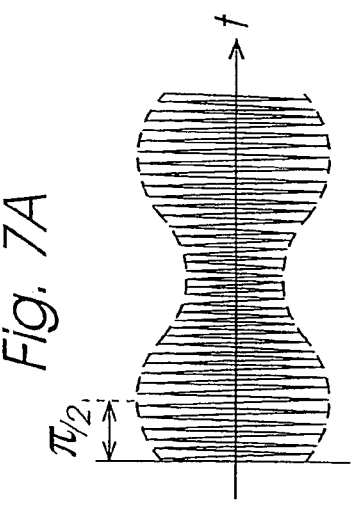
Figure 8A:
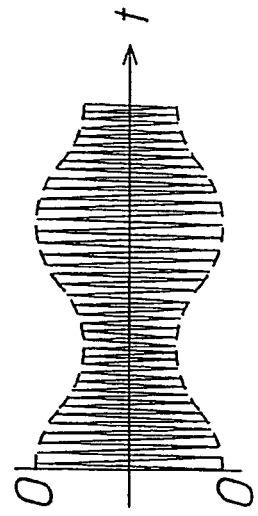
Figure 8B:
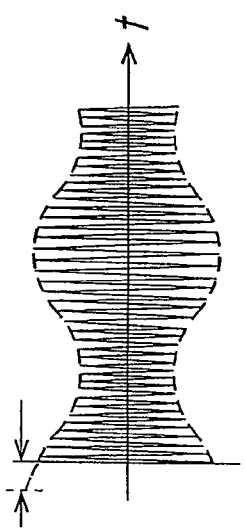
Figure 8C:
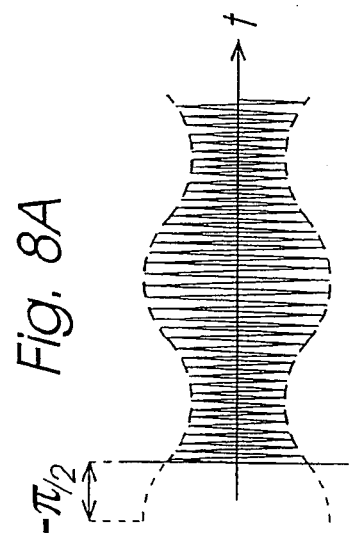
Figure 9:
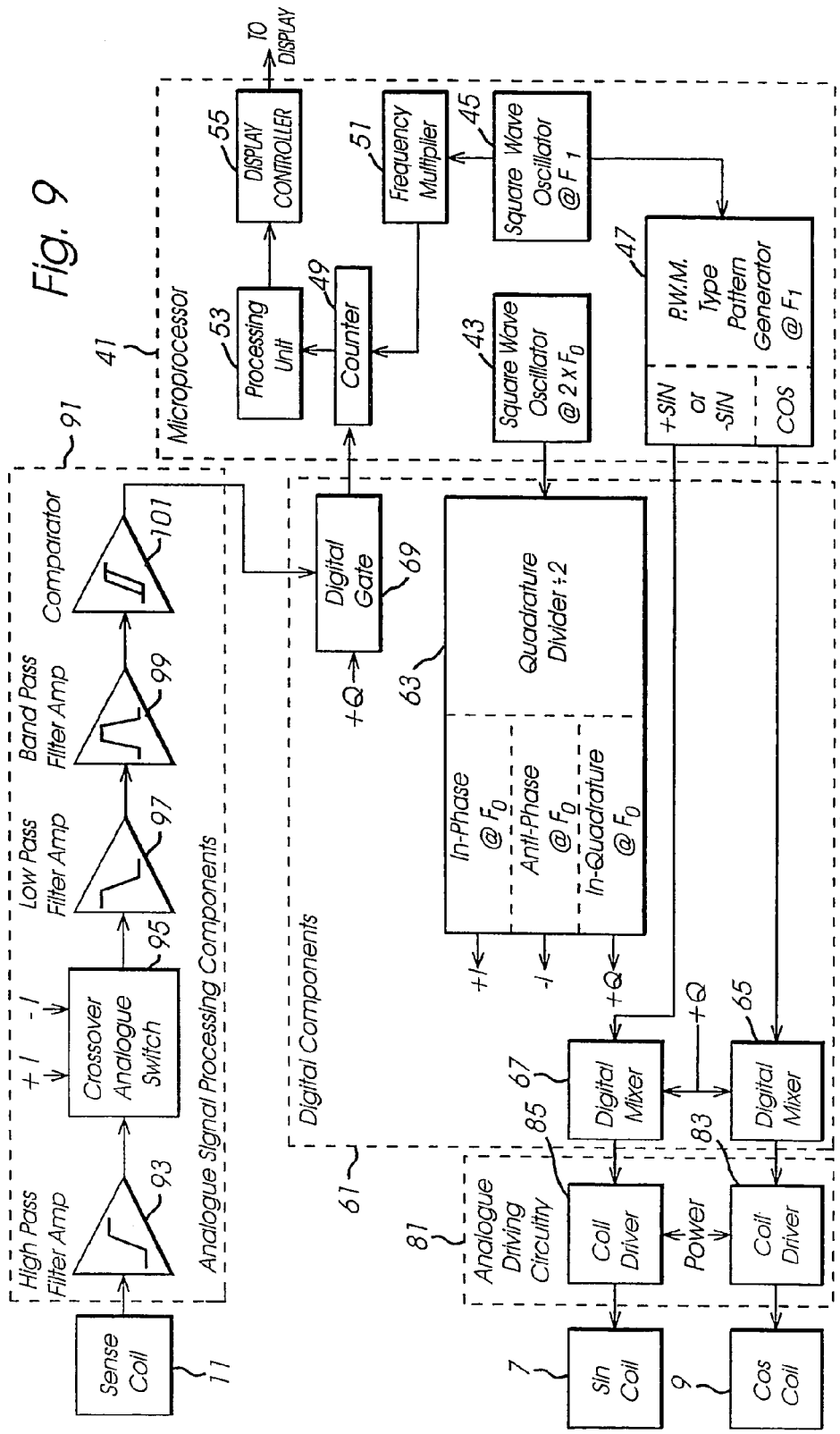
Figure 10:
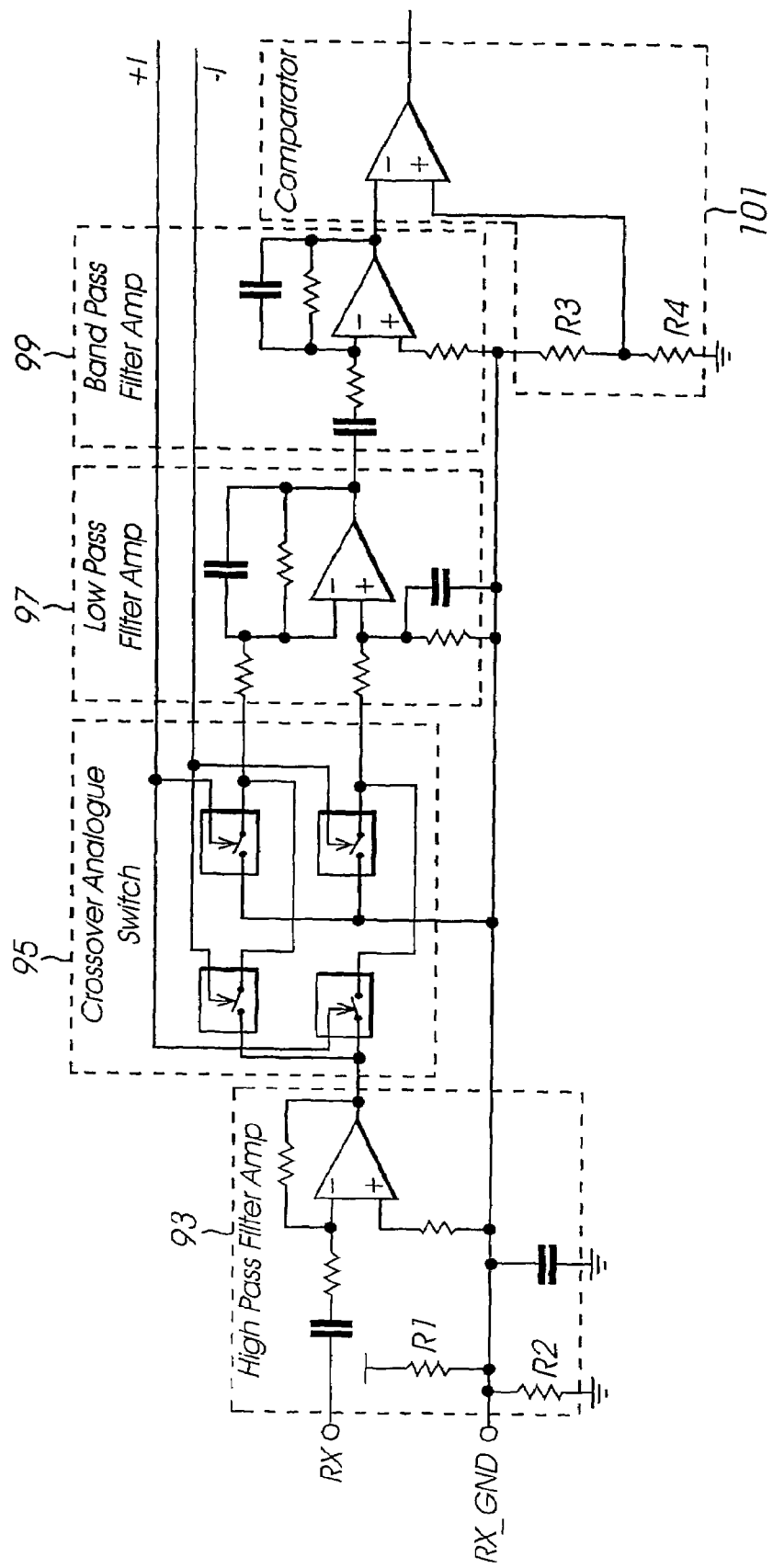
Figure 12:
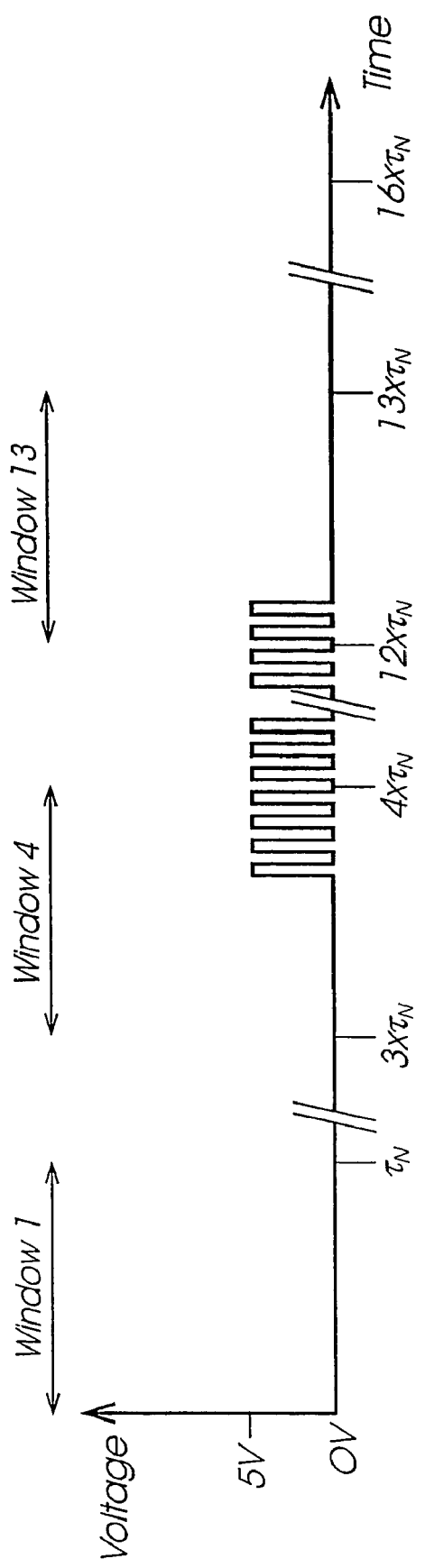
Figure 13:
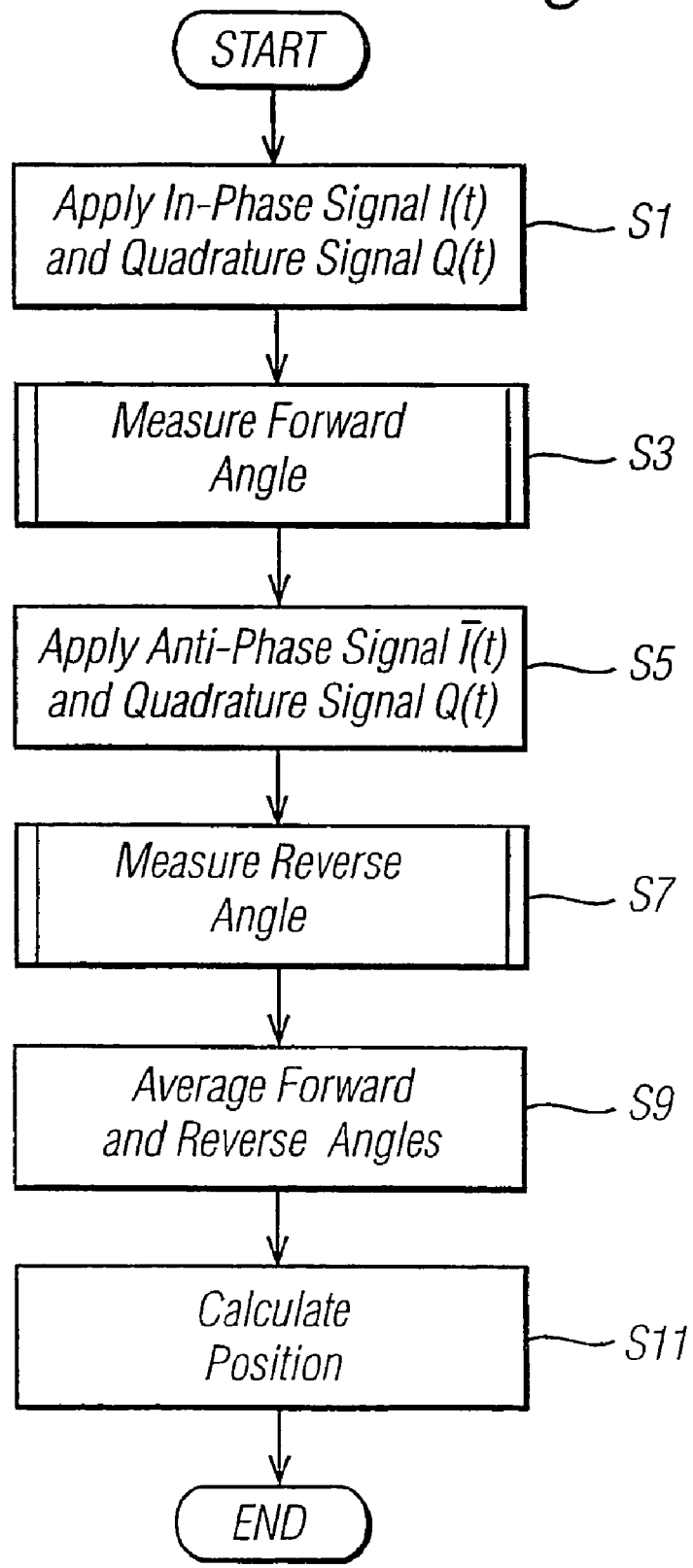
Figure 14:
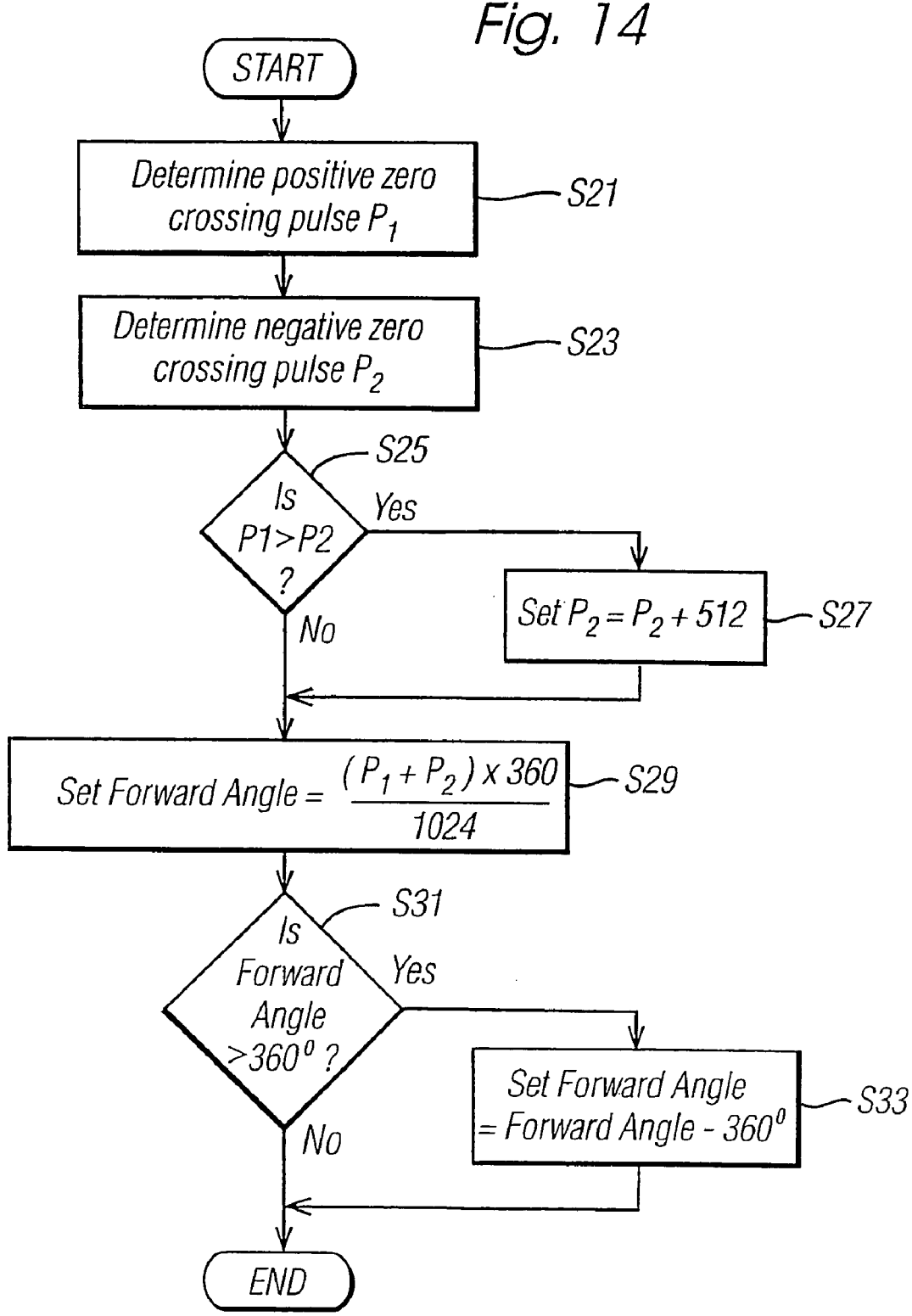
Figure 15:
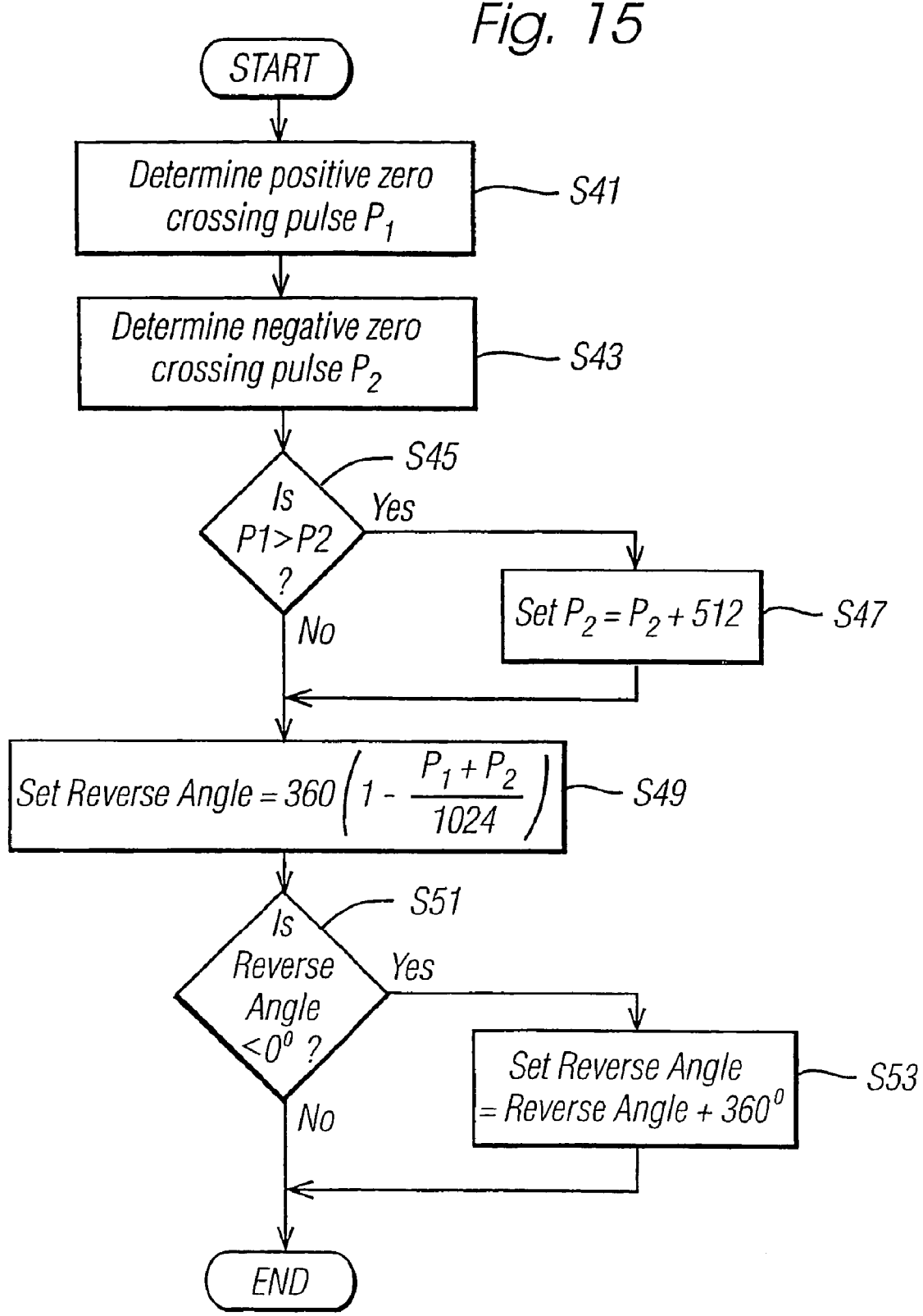

FIG. 5A schematically shows how the phase of a signal induced in a resonant circuit which forms part of the sensor element shown in FIG. 4 varies with the frequency of a driving signal;

FIG. 5B schematically shows how the amplitude of a signal induced in the resonant circuit which forms part of the sensor element illustrated in FIG. 4 varies with the frequency of the driving signal;

FIG. 6A is a timing diagram showing a signal applied to the cosine coil illustrated in FIG. 3B;

FIG. 6B is a timing diagram showing a first signal applied to the sine coil illustrated in FIG. 3A;

FIG. 6C is a timing diagram showing a second signal applied to the sine coil illustrated in FIG. 3A:

FIGS. 7A to 7C are timing diagrams showing signals induced in the sense coil illustrated in FIG. 3C when the signal illustrated in FIG. 6A is applied to the cosine coil and the signal illustrated in FIG. 6B is applied to the sine coil for three different positions of the sensor element;

FIGS. 8A to 8C are timing diagrams showing signals induced in the sense coil illustrated in FIG. 3C when the signal illustrated in FIG. 6A is applied to the cosine coil and the signal illustrated in FIG. 6C is applied to the sine coil for three different positions of the sensor element;

FIG. 9 is a block diagram showing in more detail the processing circuitry of the position sensor illustrated in FIG. 1;

FIG. 10 shows in more detail analogue signal processing components of the processing circuitry illustrated in FIG. 9;

FIGS. 11A to 11D are timing diagrams illustrating signals at various positions within the processing circuitry illustrated in FIG. 9;

FIG. 12 is a timing diagram showing pulses received at a microprocessor forming part of the processing circuitry illustrated in FIG. 9;

FIG. 13 is a flow chart showing the operations performed to calculate the position of the sensor element of the position sensor illustrated in FIG. 1;

FIG. 14 is a flow chart showing in more detail the operations performed to calculate a forward angle used to calculate the position of the sensor element of the position sensor illustrated in FIG. 1; and FIG. 15 is a flow chart showing in more detail the operations performed to calculate a reverse angle used to calculate the position of the sensor element of the position sensor illustrated in FIG. 1.

FIG. 1 schematically shows a position sensor for detecting the position of a sensor element 1 which is slidably mounted to a support 3 to allow linear movement along a measurement direction (the direction X in FIG. 1). A printed circuit board (PCB) 5 extends along the measurement direction adjacent to the support 3 and has printed thereon conductive tracks which form a sine coil 7, a cosine coil 9 and a sense coil 11, each of which are connected to a control unit 13. A display 15 is also connected to the control unit 13 for displaying a number representative of the position of the sensor element 1 along the support 3.

As shown in FIG. 1, the PCB 5 is generally rectangular in shape with the lengthwise axis aligned with the measurement direction and the widthwise axis aligned perpendicular to the measurement direction. The sine coil 7, cosine coil 9 and sense coil 11 are connected to the control unit via a lengthwise edge of the PCB 5, which corresponds to the position value of x equals zero, with the position value increasing along the length of the PCB 5 from the lengthwise edge corresponding to x equals zero.

Figure 2:
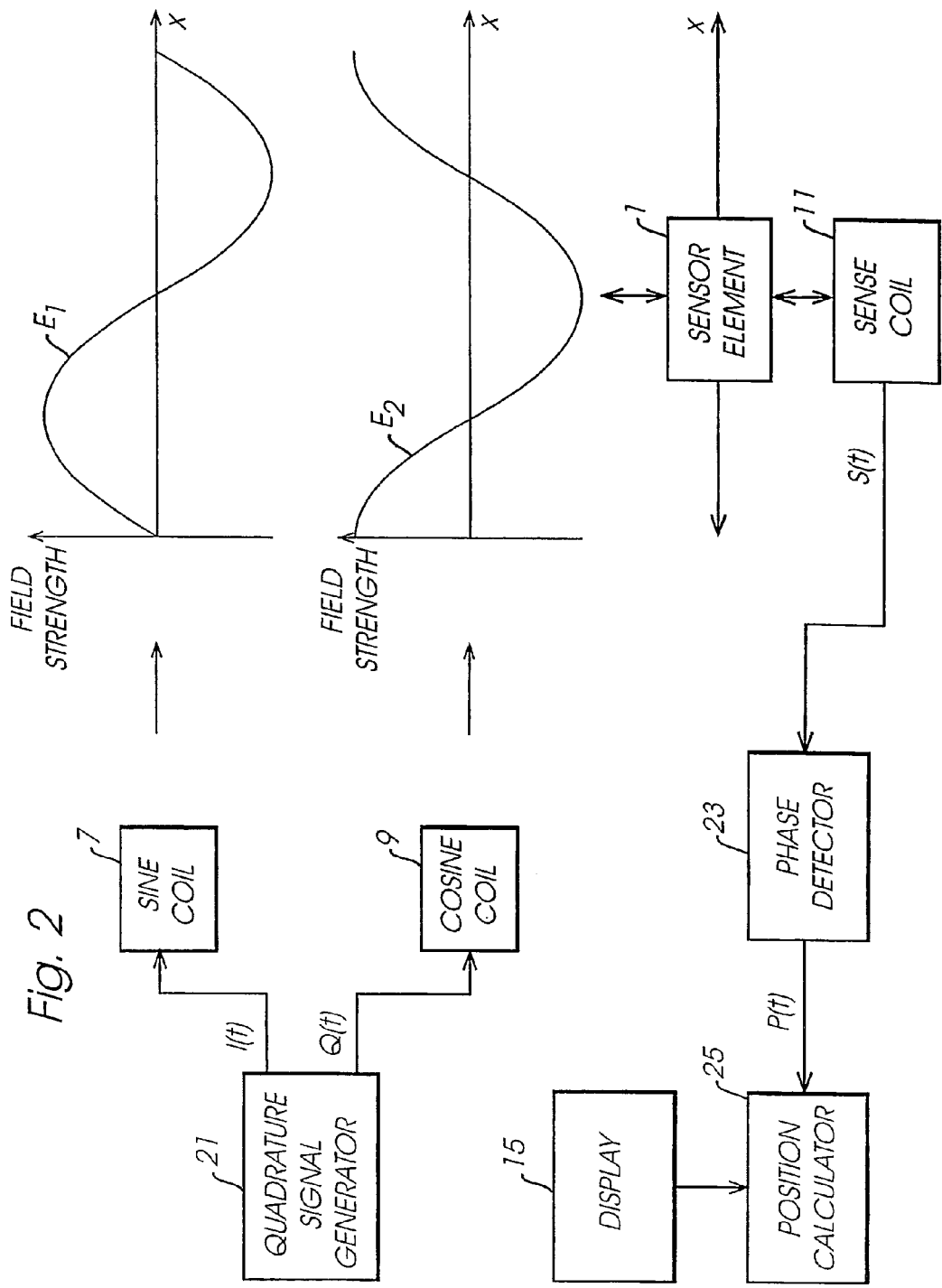

An overview of the operation of the position sensor illustrated in FIG. 1 will now be given with reference to FIG. 2. The control unit 13 includes a quadrature signal generator 21 which generates an in-phase signal I(t) and a quadrature signal Q(t) at respective different outputs. The in-phase signal I(t) is generated by amplitude modulating an oscillating carrier signal having a carrier frequency $f_0$, which in this embodiment is 2 MHz, using a first modulation signal which oscillates at a modulation frequency $f_1$, which in this embodiment is 3.9 kHz. The in-phase signal I(t) is therefore of the form:

$$I(t) = A \sin 2\pi f_1 t \cos 2\pi f_0 t \quad (1)$$

Similarly, the quadrature signal Q(t) is generated by amplitude modulating the oscillating carrier signal having carrier frequency $f_0$ using a second modulation signal which oscillates at the modulation frequency $f_1$, with the second modulation signal being $\pi/2$ radians (90°) out of phase with the first modulation signal. The quadrature signal Q(t) is therefore of the form:

$$Q(t) = A \cos 2\pi f_1 t \cos 2\pi f_0 t \quad (2)$$

The in-phase signal I(t) is applied to the sine coil 7 and the quadrature signal Q(t) is applied to the cosine coil 9.

The sine coil 7 is formed in a pattern which causes current flowing through the sine coil 7 to produce a first magnetic field $B_1$ whose field strength component resolved perpendicular to the PCB 5 varies sinusoidally along the measurement direction in accordance with the function:

$$B_1 = B \sin(2\pi x/L) \quad (3)$$

where L is the period of the sine coil in the x direction.

Similarly, the cosine coil 9 is formed in a pattern which causes current flowing through the cosine coil 9 to produce a second magnetic field $B_2$ whose field strength component resolved perpendicular to the PCB 5 also varies sinusoidally along the measurement direction, but with a phase difference of $\pi/2$ radians (90°) from the phase of the first magnetic field $B_1$, giving:

$$B_2 = B \cos(2\pi x/L) \quad (4)$$

In this way, the total magnetic field $B_T$ generated at any position along the measurement direction will be formed by a first component from the first magnetic field $B_1$ and a second component from the second magnetic field $B_2$, with the magnitudes of the first and second components resolved perpendicular to the PCB 5 varying along the measurement direction.

By applying the in-phase signal I(t) and the quadrature signal Q(t) to the sine coil 7 and the cosine coil 9 respectively, the generated total magnetic field component $B_T$ resolved perpendicular to the PCB 5 oscillates at the carrier frequency $f_0$ in accordance with an amplitude envelope function which varies at the modulation frequency $f_1$, with the phase of the amplitude envelope function varying along the measurement direction. Thus:

$$B_T \propto \cos 2\pi f_0 t \cdot \cos(2\pi f_1 t - 2\pi x/L) \quad (5)$$

In effect, the phase of the amplitude envelope function rotates along the measurement direction.

In this embodiment, the sensor element 1 includes a resonant circuit having a resonant frequency substantially equal to the carrier frequency $f_0$. The total magnetic field component $B_T$ therefore induces an electric signal in the resonant circuit which oscillates at the carrier frequency $f_0$ and has an amplitude which is modulated at the modulation frequency $f_1$ with a phase which is dependent upon the position of the sensor element 1 along the measurement direction. The electric signal induced in the resonant circuit in turn generates a magnetic field which induces a sensed electric signal S(t) in the sense coil 11, with the sensed electric signal S(t) oscillating at the carrier frequency $f_0$. The amplitude of the sensed signal S(t) is also modulated at the modulation frequency $f_1$ with a phase which is dependent upon the position of the sensor element 1 along the measurement direction. The sensed signal S(t) is input to a phase detector 23 which demodulates the sensed signal S(t), to remove the component at the carrier frequency $f_0$, and detects the phase of the remaining amplitude envelope function relative to the excitation waveform. The phase detector 23 then outputs a phase signal P(t) representative of the detected phase to a position calculator 25, which converts the detected phase into a corresponding position value and outputs a drive signal to the display 15 to display the corresponding position value.

By using a carrier frequency $f_0$ which is greater than the modulation frequency $f_1$, the inductive coupling is performed at frequencies away from low-frequency noise sources such as the electric mains at 50/60 Hz, while the signal processing can still be performed at a relatively low frequency which is better suited to digital processing. Further, increasing the carrier frequency $f_0$ facilitates making the sensor element 1 small, which is a significant advantage in many applications. Increasing the carrier frequency $f_0$ also produces higher signal strengths.

The separate components of the position sensor shown in FIG. 1 will now be discussed in more detail.

As shown in FIG. 3A, the sine coil 7 is formed by a conductive track which generally extends around the periphery of the PCB 5 apart from a cross-over point halfway along the PCB 5 in the measurement direction, at which the conductive track on each widthwise edge of the PCB 5 crosses to the corresponding opposing widthwise edge of the PCB 5. In this way, effectively a first current loop 21a and a second current loop 21b are formed. When a signal is applied to the sine coil 7, current flows around the first current loop 21a and the second current loop 21b in opposite directions, and therefore the current flowing around the first current loop 21a generates a magnetic field which has an opposite polarity to the magnetic field generated by current flowing around the second current loop 21b. This results in the sinusoidal variation of the field strength of the component of the first magnetic field $B_1$ resolved perpendicular to the PCB 5 given by equation 3 above.

In particular, the lay-out of the sine coil 7 is such that the field strength of the component of the first magnetic field $B_1$ resolved perpendicular to the PCB 5 which is generated by current flowing through the sine coil 7 varies along the measurement direction from approximately zero at the point where x equals 0, to a maximum value at x equals L/4 (the position A as shown in FIG. 3A), then back to zero at x equals L/2 (the position C as shown in FIG. 3A), then to a maximum value (having opposite polarity to the maximum value at position A) at x equals 3L/4, and then back to zero at x equals L. Thus the sine coil 7 generates a magnetic field component perpendicular to the PCB 5 which varies according to one period of the sine function.

As shown in FIG. 3B, the cosine coil 9 is formed by a conductive track which generally extends around the periphery of the PCB 5 apart from two cross-over points, located one-quarter and three-quarters of the way along the PCB 5 in the measurement direction respectively. In this way, three loops 23a, 23b and 23c are formed of which the outer loops 23a and 23c are half the size of the inner loop 23b. When a signal is applied to the cosine coil 9, current flows in one direction around the outer loops 23a and 23c and in the opposite direction around the inner loop 23b. In this way, the magnetic field generated by the current flowing around the inner loop 23b has an opposite polarity to the magnetic field generated by the current flowing around the outer loops 23a and 23c. This results in the sinusoidal variation of the field strength of the component of the second magnetic field $B_2$ resolved perpendicular to the PCB 5 given by equation 4 above.

In particular, the lay-out of the cosine coil 9 is such that the field strength of the component of the second magnetic field $B_2$ resolved perpendicular to the PCB 5 which is generated by current flowing through the cosine coil 9 varies along the measurement direction from a maximum value at x equals 0, to zero at x equals L/4 (the position A as shown in FIG. 3B), then back to a maximum value (having opposite polarity to the maximum value at x equals 0) at x equals L/2 (the position C as shown in FIG. 3B), and then back to zero at x equals 3L/4, and then back to a maximum value (having the same polarity as the maximum value at x equals 0) at x equals L. Thus, the cosine coil 7 generates a magnetic field component perpendicular to the PCB 5 which varies according to one period of the cosine function as given by equation 4 above.

As shown in FIG. 3C, the sense coil 11 is formed by a conductive track which generally extends around the periphery of the PCB 5 forming a single loop.

The layout of the sine coil 7 is such that the electric current induced in the sense coil 11 by current flowing around the first current loop 21a is substantially cancelled out by the electric current induced in the sense coil 11 by current flowing around the second current loop 21b. Similarly, for the cosine coil 9 the current induced in the sense coil 11 by the outer loops 23a, 23c is cancelled out by the current induced in the sense coil 11 by the inner loop 23b. Using such balanced coils has the further advantage that the electromagnetic emissions from the sine coil 7 and the cosine coil 9 diminish with distance at a faster rate than for a single planar winding. This allows larger drive signals to be used while still satisfying regulatory requirements for electromagnetic emissions. This is particularly important because the regulatory requirements for electromagnetic emissions are becoming stricter and stricter.

FIG. 4 shows in more detail the sensor element 1. As shown, in this embodiment the sensor element 1 includes a coil 31 whose ends are connected together via a capacitor 33. As the coil 31 has an associated inductance, the coil 31 and capacitor 33 together form a resonant circuit. In this embodiment, the resonant circuit has a nominal resonant frequency $f_{res}$ of 2 MHz (which is equal to the carrier frequency $f_0$) although the actual resonant frequency will vary in accordance with environmental factors such as temperature and humidity.

As described above, when an oscillating drive signal is applied to one or both of the sine coil 7 and the cosine coil 9, an oscillating signal at the same frequency is induced in the resonant circuit of the sensor element 1. However, a phase lag occurs between the drive signal and the induced signal, the amount of the phase lag being dependent upon the relationship between the frequency of the drive signal and the resonant frequency of the resonant circuit. As shown in FIG. 5A, the phase lag varies most quickly around the resonant frequency of the resonant circuit, with the phase lag at the resonant frequency being $\pi/2$ radians (90°). The higher the quality factor of the resonant circuit, the more quickly the phase varies around the resonant frequency. However, as shown in FIG. 5B, the lower the quality factor for the resonant circuit, the less the amplitude of the electric signal induced in the resonant circuit. It is therefore necessary to strike a compromise between signal strength and rate of change of phase with frequency when selecting the value of the quality factor for the resonant circuit.

The quadrature signals generated by the quadrature signal generator 21 and applied as drive signals to the sine coil 7 and cosine coil 9 will now be described in more detail with reference to FIGS. 6A to 6C.

As shown in FIG. 6A, the quadrature signal generator 21 generates the quadrature signal Q(t) by modulating the carrier signal using the first modulation signal. As shown, in this embodiment the first modulation signal does not apply a "full" modulation to the carrier signal. In other words, the amplitude envelope function indicated by dotted lines in FIG. 6A does not reach zero amplitude. The actual quadrature signal Q(t) is therefore given by:

$$Q(t) = C \cos 2\pi f_0 t + B \cos 2\pi f_1 t \cos 2\pi f_0 t \qquad (6)$$

As shown in FIG. 6B, the quadrature signal generator 21 generates the in-phase signal I(t) by modulating the amplitude of the carrier signal using the second modulation signal, whose phase lags the phase of the first modulation signal by $\pi/2$ radians (i.e. 90°). Again, in this embodiment the second modulation signal does not apply a full modulation to the carrier signal. The actual in-phase signal I(t) is therefore given by:

$$I(t) = C \cos 2\pi f_0 t + B \sin 2\pi f_1 t \cos 2\pi f_0 t \qquad (7)$$

The in-phase signal I(t) and the quadrature signal Q(t) each comprise three frequency components, one at $f_0$, one at $(f_0+f_1)$ and one at $(f_0-f_1)$. It can be seen from FIG. 5A that these three components will each induce an electric signal in the resonant circuit of the sensor element 1 with a respective different phase lag. This will result in a phase shift in the sensed signal S(t) which needs to be corrected in order to obtain an accurate position measurement, bearing in mind that the phase of the sensed signal S(t) is used to determine the position of the sensor element 1. In this embodiment, as will be discussed in more detail hereafter, this correction is achieved by performing a second phase measurement for which the in-phase signal I(t) is replaced by an "anti-phase" signal $\bar{I}(t)$.

As shown in FIG. 6C, the quadrature signal generator 21 generates the anti-phase signal $\bar{I}(t)$ by modulating the carrier signal (having carrier frequency $f_0$) by a third modulation signal which is also at the modulation frequency $f_1$ but whose phase leads the phase of the first modulation signal by $\pi/2$ radians (i.e. 90°). Again, in this embodiment the third modulation signal does not apply a full modulation to the carrier signal. Thus, the anti-phase signal $\bar{I}(t)$ is given by:

$$\bar{I}(t) = C \cos 2\pi f_0 t - B \sin 2\pi f_1 t \cos 2\pi f_0 t \qquad (8)$$

The sensed signals S(t) induced in the sense coil 11 when the in-phase signal I(t) and the quadrature signal Q(t) are respectively applied to the sine coil 7 and cosine coil 9 will now be described with reference to FIGS. 7A to 7C. In FIGS.

7A to 7C, it has been assumed that no phase shift is introduced by the resonant circuit so that the phase shift is entirely due to the position of sensor element 1.

FIG. 7A shows the sensed signal S(t) when the sensor element 1 is positioned adjacent the point A (where x equals L/4) identified in FIGS. 1 and 3A to 3C. At the point A, the field strength of the magnetic field generated by the cosine coil 9 is approximately zero and therefore, assuming no phase shift due to the resonant circuit, the sensed signal S(t) matches the in-phase signal I(t). Therefore, the sensed signal S(t) has a phase lag of $\pi/2$ radians (90°) compared to the quadrature signal Q(t).

FIG. 7B shows the sensed signal S(t) when the sensor element 1 is positioned adjacent the point B (where x equals 3L/8), where the field strength of the magnetic fields generated by the sine coil 7 and the cosine coil 9 are approximately equal and therefore, assuming no phase shift due to the resonant circuit, the sensed signal S(t) has a phase lag of $\pi/4$ radians (45°) compared to the quadrature signal Q(t).

FIG. 7C shows the sensed signal S(t) when the sensor element 1 is positioned adjacent the point C (where x equals L/2), where the field strength of the magnetic field generated by the sine coil 7 is approximately zero and therefore, assuming no phase shift due to the resonant circuit, the sensed signal S(t) matches the quadrature signal Q(t). Therefore, the sensed signal S(t) is in phase with the quadrature signal Q(t).

From equation 5 above, it can be seen that the phase of the sensed signal S(t) decreases as the position value increases when the in-phase signal I(t) and the quadrature signal Q(t) are applied to the sine coil 7 and the cosine coil 9 respectively.

The sensed signals S(t) induced in the sense coil 11 when the anti-phase signal $\bar{I}(t)$ and the quadrature signal Q(t) are respectively applied to the sine coil 7 and cosine coil 9 will now be described with reference to FIGS. 8A to 8C. Again, it has been assumed that no phase shift is introduced by the resonant circuit so that the phase shift is entirely due to the position of sensor element 1.

FIG. 8A shows the sensed signal S(t) when the sensor element 1 is positioned adjacent the point A, where the field strength of the magnetic field generated by the cosine coil 9 is approximately zero and therefore, assuming no phase shift is introduced by the resonant circuit, the sensed signal S(t) matches the anti-phase signal $\bar{I}(t)$. Therefore, the phase of the sensed signal S(t) leads the phase of the quadrature signal Q(t) by $\pi/2$ radians (90°).

FIG. 8B shows the sensed signal S(t) when the sensor element 1 is positioned adjacent the point B, where the field strength of the magnetic field generated by the sine coil 7 and the cosine coil 9 is approximately equal and therefore, assuming no phase shift is introduced by the resonant circuit, the phase of the sensed signal S(t) leads the phase of the quadrature signal Q(t) by $\pi/4$ radians (45°).

FIG. 8C shows the sensed signal S(t) when the sensor element 1 is positioned adjacent the point C, where the field strength of the magnetic field generated by the sine coil 7 is approximately zero and therefore, assuming no phase shift is introduced by the resonant circuit, the sensed signal S(t) is in phase with the quadrature signal Q(t).

As illustrated by FIGS. 8A to 8C, the phase of the sensed signal S(t) increases linearly with the position value when the anti-phase signal $\bar{I}(t)$ and the quadrature signal Q(t) are applied to the sine coil 7 and the cosine coil 9 respectively.

As described above, assuming no phase shift is introduced by the resonant circuit, for each position x in the measurement direction a position-related phase shift $\phi(x)$ is introduced when the in-phase signal I(t) and the quadrature signal Q(t) are applied, and a position-related phase shift $-\phi(x)$ is introduced when the anti-phase signal $\bar{I}(t)$ and the quadrature signal Q(t) are applied. In practice, the resonant circuit does introduce a phase shift $\phi_{RC}$, but the phase shift $\phi_{RC}$ is generally the same whether the in-phase signal I(t) or the anti-phase signal $\bar{I}(t)$ is applied to the sine coil 7. Therefore, in this embodiment the phase shift measured when applying the anti-phase signal $\bar{I}(t)$ is subtracted from the phase shift measured when applying the in-phase signal I(t), resulting in the phase shift $\phi_{RC}$ introduced by the resonant circuit being cancelled to give a resultant phase which is equal to twice the position-dependent phase shift $\phi(x)$.

The processing circuitry used to generate the in-phase signal I(t), the quadrature signal Q(t) and the anti-phase signal $\bar{I}(t)$, and to process the sensed signal S(t) to determine a position value, will now be described with reference to FIG. 9. As shown in FIG. 9, the processing circuitry consists of a microprocessor 41, digital components 61, analogue driving circuitry 81 and analogue signal processing components 91.

The microprocessor 41 includes a first square wave oscillator 43 which generates a square wave signal at twice the carrier frequency $f_0$ (i.e. at 4 MHz). This square wave signal is output from the microprocessor 41 to a quadrature divider unit 63 which divides the square wave signal by 2 and forms an in-phase digital carrier signal +I at the carrier frequency, an anti-phase digital carrier signal −I at the carrier frequency and a quadrature digital carrier signal +Q, also at the carrier frequency. As described hereafter, the quadrature digital carrier signal +Q is modulated to form the drive signals applied to the sine coil 7 and the cosine coil 9, while the in-phase and anti-phase digital carrier signals ±I are used to perform synchronous detection in order to demodulate the sensed signal S(t).

The microprocessor 41 also includes a second square wave oscillator 45 which outputs a modulation synchronisation signal MOD_SYNC at the modulation frequency $f_1$ to provide a reference timing. The modulation synchronisation signal MOD_SYNC is input to a Pulse Width Modulation (PWM) type pattern generator 47 which generates digital data streams at 2 MHz representative of the modulation signals at the modulation frequency $f_1$, i.e. 3.9 kHz. In particular, the PWM type pattern generator 47 generates two modulation signals which are in phase quadrature with one another, namely a cosine signal COS and either a plus sine or a minus sine signal ±SIN in dependence upon whether the in-phase signal I(t) or the anti-phase signal $\bar{I}(t)$ is to be generated.

The cosine signal COS is output by the microprocessor 41 and applied to a first digital mixer 65, in this embodiment a NOR gate, which mixes the cosine signal with the quadrature digital carrier signal, +Q, to generate a digital representation of the quadrature signal Q(t). The sine signal ±SIN is output by the microprocessor and applied to a second digital mixer 67, in this embodiment a NOR gate, together with the quadrature digital carrier signal +Q to generate a digital representation of either the in-phase signal I(t) or the anti-phase signal $\bar{I}(t)$. The digital signals output from the first and second digital mixers 65, 67 are input to first and second coil driver circuits 83, 85 respectively and the amplified signals output by the coil drivers 83, 85 are then applied to the cosine coil 9 and sine coil 7 respectively.

The digital generation of the drive signals applied to the sine coil 7 and the cosine coil 9 introduces high frequency harmonic noise. However, the coil drivers 65, 67 remove some of this high frequency harmonic noise, as does the frequency response characteristics of the cosine and sine coils 7, 9. Furthermore, the resonant circuit within the sensor element 1 will not respond to signals which are greatly above the resonant frequency and therefore the resonant circuit will also filter out a portion of the unwanted high frequency harmonic noise.

As discussed above, the signals applied to the sine coil 7 and the cosine coil 9 induce an electric signal in the resonant circuit of the sensor element 1 which in turn induces the sensed signal S(t) in the sense coil 11. The sensed signal S(t) is passed through the analogue signal processing components 91. In particular, the sensed signal S(t) is initially passed through a high pass filter amplifier 93 which both amplifies the received signal, and removes low frequency noise (e.g. from a 50 Hertz mains electricity supply device) and any DC offset. The amplified signal output from the high pass filter 93 is then input to a crossover analogue switch 95 which performs synchronous detection at the carrier frequency of 2 MHz, using the in-phase and anti-phase square wave carrier signals ±I generated by the quadrature divider 21. The in-phase and anti-phase digital carrier signals which are 90 degrees out of phase to the quadrature digital carrier signal +Q used to generate the drive signals applied to the sine coil 7 and the cosine coil 9, which are used for the synchronous detection, because, as discussed above, the resonant circuit of the sensor element 1 introduces a substantially 90 degrees phase shift to the carrier signal.

The signal output from the crossover analogue switch 95 substantially corresponds to a fully rectified version of the signal input to the crossover analogue switch 95 (i.e. with the negative voltage troughs in the signal folded over the zero voltage line to form voltage peaks lying between the original voltage peaks). This rectified signal is then passed through a low pass filter amplifier 97 which essentially produces a time-averaged or smoothed signal having a DC component and a component at the modulation frequency $f_1$. The DC component appears as a result of the rectification performed by the synchronous detection process.

The signal output from the low pass filter amplifier 97 is then input to a band-pass filter amplifier 99, centred at the modulation frequency $f_1$, which removes the DC component. The signal output from the bandpass filter amplifier 99 is input to a comparator 101 which converts the input signal to a square wave signal whose timing is compared with the timing of the modulation synchronisation signal MOD_SYNC to determine the position of the sensor element 1.

FIG. 10 shows in more detail the analogue signal processing components 91. As shown, one end of the sense coil 11 is connected between two resistors R1 and R2, which are connected in series between the supply voltage and "true" ground, to set an acting ground voltage level $V_{AG}$. In particular, in this embodiment the supply voltage is 5V and the resistance of resistor R1 is equal to the resistance of resistor R2 to give an acting ground voltage level of 2.5V.

Figure 11A:
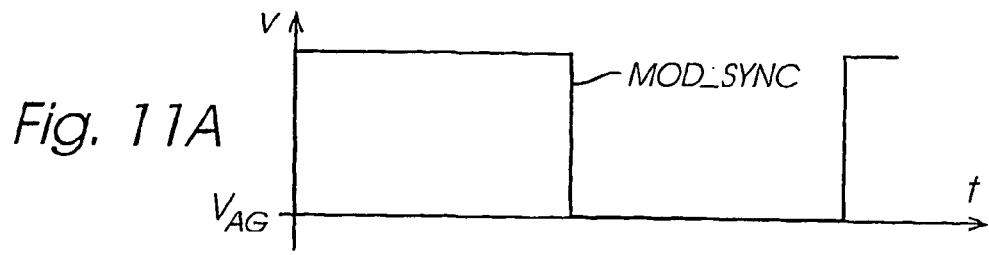
Figure 11B:
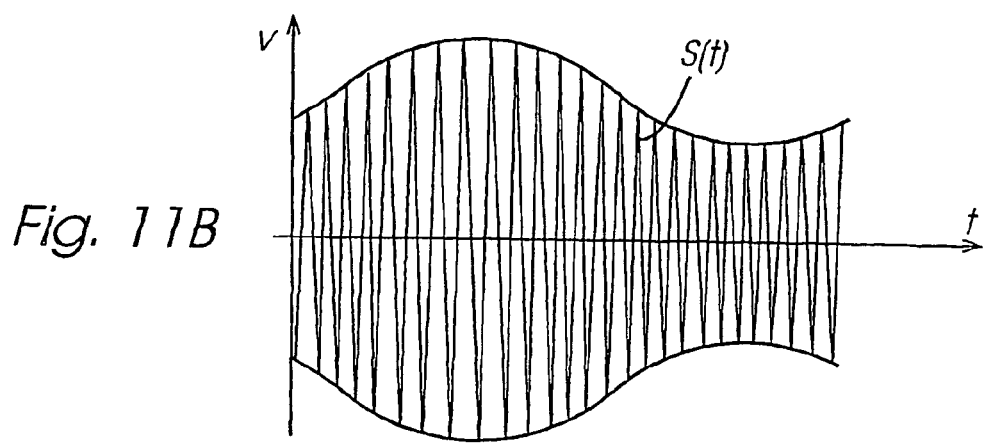
Figure 11C:
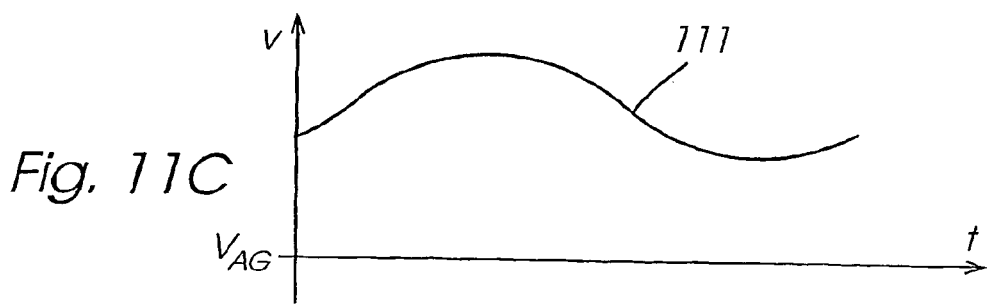
Figure 11D:
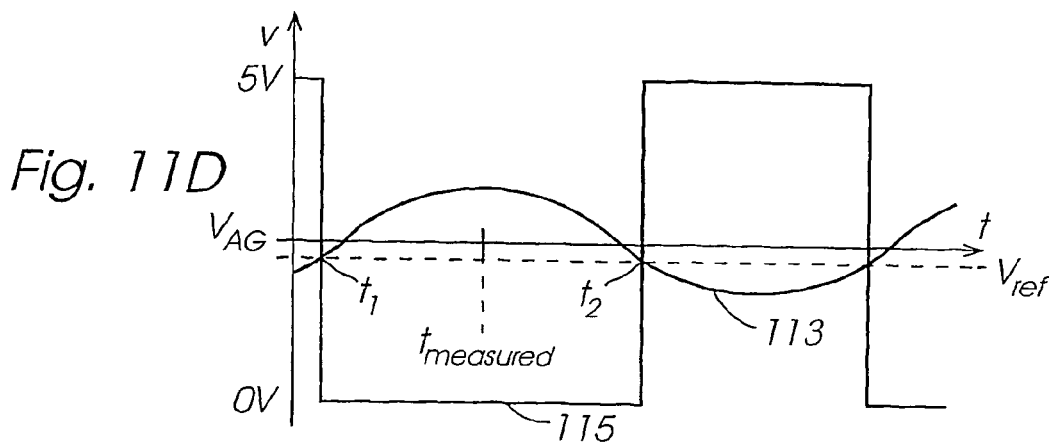

FIG. 11A shows the modulation synchronisation signal MOD_SYNC and FIG. 11B shows the sensed signal S(t) induced in the sense coil 11. As shown, it can be seen that the amplitude envelope function of the sensed signal S(t) is not in phase with the modulation synchronisation signal MOD_SYNC. FIG. 11C shows the signal 111 output by the low pass filter amplifier 97, which substantially corresponds to the amplitude envelope function. FIG. 11D shows the signal 113 output by the band pass filter amplifier 99 and the square wave 115 output by the comparator 101.

In this embodiment, the comparator 101 is an inverting comparator whose output is high (i.e. 5V) when the signal 113 output from the band pass filter amplifier 99 is below a reference voltage level $V_{ref}$ and whose output is low (i.e. 0V) when the signal 113 output from the band pass filter amplifier is above the reference voltage level $V_{ref}$. As can be seen from FIG. 10, the reference voltage level $V_{ref}$ is not the acting ground voltage level $V_{AG}$, but rather a voltage below the acting ground voltage level $V_{AG}$ which is drawn from between two resistors R3 and R4 connected between the acting ground voltage level $V_{AG}$ and the true ground. This prevents the comparator 101 from generating spurious signals when there is no output from the band pass filter amplifier 99 except for a small amount of noise. However, this also means that the leading and trailing edges of the signal output by the comparator 101 do not coincide with the points where the signal 113 output by the band pass filter amplifier 99 crosses the acting ground voltage level $V_{AG}$. To avoid this introducing a phase error, the timing of the signal 115 output by the comparator 101 is determined from timing of the midpoint between a trailing edge and a leading edge. In particular, if as shown in FIG. 11D the trailing edge is at a time $t_1$ and the leading edge is at a time $t_2$, then the measured time corresponds to $(t_1+t_2)/2$.

Returning to FIG. 9, the square wave signal output by the comparator 101 (which is in effect a digital signal) is applied to a digital gate 69, which in this embodiment is a NOR gate, together with the quadrature digital carrier signal +Q output by the quadrature divider 63. The digital gate 69 therefore outputs a series of pulses at the carrier frequency $f_0$ when the output from the comparator 101 is low (i.e. 0V), and no signal when the output of the comparator 101 is high (i.e. 5V). FIG. 12 shows an example of the output from the digital gate 69 for one period of the MOD_SYNC signal, which will hereafter be termed a frame.

As shown in FIG. 9, the pulses output from the digital gate 69 are input to a counter 49 forming part of the microprocessor 41. The MOD_SYNC signal output by the second square wave oscillator 45 is input to a frequency multiplier 51 which, in this embodiment, multiplies the frequency of the MOD_SYNC signal by 16 and outputs the multiplied signal to the counter 49. Each period $\tau_N$ of the multiplied signal will hereafter be called a window so that a frame corresponds to 16 windows, referred to as window 1 to window 16. In this embodiment, the modulation frequency is set to 2 MHz/$2^9$=3.9 kHZ. This means that each frame corresponds to 512 periods of the carrier signal +Q input to the digital gate 25, and each window corresponds to 32 periods (512/16) of the carrier signal +Q.

The count value of the counter 49 is noted and stored by a processing unit 53 after each window within a frame, and then reset to zero. Thus, for each frame the processing unit receives 16 count values from which the processing unit 53 determines the position of the sensor element 1 and outputs a signal representative of the determined position to a display controller 55, which outputs drive signals to the display 15 to show the determined position.

The processing performed by the processing unit 53 to determine the position of the sensor element 1 will now be described in more detail with reference to FIGS. 13 to 15.

As shown in FIG. 13, initially the processing unit 53 sends a control signal to the PWM type pattern generator 47 which responds by outputting the cosine signal COS and the plus sine signal +SIN so that the in-phase signal I(t) and the quadrature signal Q(t) are applied, in step S1, to the sine coil 7 and cosine coil 9 respectively. The processing unit 53 then measures, in step S3, the phase angle between the sensed signal S(t) and the MOD_SYNC signal, which will hereafter be termed the forward angle, using sixteen count values corresponding to a frame obtained while the in-phase signal I(t) and quadrature signal Q(t) are applied.

FIG. 14 shows the main steps performed to measure the forward angle. Firstly, the processing unit 53 identifies, in step S21, the pulse corresponding to when the signal 113 output by the band pass filter amplifier 99 crosses the reference voltage $V_{ref}$ in a positive direction. In particular, this "positive zero crossing" pulse is identified by identifying three consecutive windows (which will be termed windows k, k+1 and k+2) whose respective count values are 0, a number $n_1$ intermediate 0 and 32, and 32. The pulse number $P_1$ of the positive zero crossing pulse is then calculated by multiplying 32 by (k+1) and then subtracting the count value $n_1$ of window k+1. Thus for the exemplary frame shown in FIG. 12, k is equal to 3 and the pulse number $P_1$ of the positive zero crossing pulse is 124 (i.e. (4×32)−4).

Next, the processing unit 53 identifies, in step S23, the pulse corresponding to when the signal 113 output by the band pass filter amplifier 99 crosses the reference voltage $V_{ref}$ in a negative direction. This "negative zero crossing pulse" is identified by identifying three consecutive windows (which will be termed windows l, l+1, l+2) whose respective count values are 32, a number $n_2$ intermediate 0 and 32, and 0. The pulse number $P_2$ for the negative zero crossing pulse is then calculated by multiplying 32 by 1 and adding the count value $n_2$ of window l+1. Thus, for the exemplary frame shown in FIG. 12, l is equal to 12 and the pulse number of the negative zero crossing pulse is 386 ((12×32)+2).

The processing unit 53 then determines, in step S25, if the pulse number $P_1$ is greater than the pulse number $P_2$, which will occur if the beginning of a frame occurs partway through a sequence of pulses. If it is determined that the pulse number $P_1$ is greater than the pulse number $P_2$, then the processing unit 53 adds, in step S27, 512 (i.e. the number of pulses corresponding to a frame) to the value of the pulse number $P_2$. The processing unit 53 then sets the forward angle, which corresponds to the timing from the beginning of a frame to the midpoint of a sequence of pulses, by averaging the pulse numbers $P_1$ and $P_2$ (i.e. $(P_1+P_2)/2$) to obtain a pulse number corresponding to the midpoint of the sequence of pulses, and then multiplying the obtained pulse number by 360/512.

The processing unit 53 then checks, in step S31, if the forward angle is greater than 360°, which can happen if the start of a frame occurs partway through a sequence of pulses. If the forward angle is greater than 360°, then the processing unit 53 subtracts, in step S33, 360 from the forward angle.

Returning to FIG. 13, after measuring the forward angle the processing unit 53 sends a control signal to the PWM type pattern generator 47 which responds by outputting the cosine signal COS and the minus sine signal −SIN so that the anti-phase signal Ī(t) and the quadrature signal Q(t) are applied, in step S5, to the sine coil 7 and cosine coil 9 respectively. The processing unit 53 then measures, in step S7, the reverse phase angle between the sensed signal S(t) and the MOD_SYNC signal, which will hereafter be termed the reverse angle, using sixteen count values corresponding to a frame obtained while the anti-phase signal Ī(t) and quadrature signal Q(t) are applied.

FIG. 15 shows the main steps performed to measure the reverse angle. Firstly the processing unit determines the pulse numbers $P_1$ and $P_2$ of the positive zero crossing pulse, step S41, and the negative zero crossing pulse, step S43, in the same manner as described above for the forward angle calculation. The processing unit 53 then determines, in step S45, if the pulse number $P_1$ is greater than the pulse number $P_2$, and if this is the case then the processing unit adds, in step S47, 512 to the value of the pulse number $P_2$.

The processing unit 53 then sets, in step S49, the reverse angle, which corresponds to the timing from the end of a frame to the midpoint of the sequence of pulses, by averaging the pulse numbers $P_1$ and $P_2$ to obtain the pulse number corresponding to the midpoint of the sequence of pulses, multiplying the obtained pulse number by 360/512 and the subtracting the result of the multiplication from 360. The processing unit 53 then checks, in step S51, if the reverse angle is less than 0°, which can occur if the sequence of pulses straddles two frames, and if this is the case adds, in step S53, 360 to the reverse angle.

Returning to FIG. 13, the processing unit 53 then averages, in step S9, the forward and reverse angles, which as discussed above removes the fixed phase shift $\phi_{RC}$ introduced by the resonant circuit within the sensor element 1 to give an average angle representative of the position of the sensor element 1. The processing unit 53 then converts, in step S11, the average angle into a position value by multiplying the average angle by a scaling factor. The position value is then displayed on the display 15.

Modifications and Further Embodiments

The amount of the phase shift $\phi_{RC}$ introduced by the resonant circuit depends upon the modulation frequency $f_1$ because the lower the modulation frequency, the closer the frequency components of the magnetic fields generated by the sine coil 7 and cosine coil 9 are in frequency. For example, if the modulation frequency $f_1$ is equal to the resonant frequency divided by ten times the quality factor then the phase offset $\phi_{RC}$ is approximately 10°, whereas if the modulation frequency $f_1$ is equal to the resonant frequency divided by one hundred times the quality factor then the phase offset $\phi_{RC}$ is approximately 1°. This implies that the modulation frequency $f_1$ should be as low as possible. However, a disadvantage of reducing the modulation frequency is that the duration of the frames increases and therefore it takes longer to make a measurement and the update rate is reduced.

As described above, the phase shift $\phi_{RC}$ introduced by the resonator circuit in the sensor element 1 is removed by effectively taking two measurements of the position with the phase of the signal applied to the sine coil 7 being reversed between measurements. It will be appreciated that in alternative embodiments, the reverse measurement need only be performed intermittently to determine a value for the phase shift $\phi_{RC}$ which has the advantage of increasing the measurement update rate. Alternatively, a predetermined value for the phase shift $\phi_{RC}$, determined by a factory calibration, could be subtracted from a single phase measurement. However, this is not preferred because it cannot allow for environmental factors which affect the resonant frequency $f_{res}$ and quality factor of the resonant circuit and therefore vary the phase shift $\phi_{RC}$.

It will be appreciated that if the reverse angle is subtracted from, rather than added to, the forward angle then the position-dependent phase shift $\phi(x)$ would be removed to leave a value equal to twice the phase shift $\phi_{RC}$. As the phase shift $\phi_{RC}$ varies with environmental factors, a measurement of the phase shift $\phi_{RC}$ can be indicative of an environmental factor. Therefore the described inductive sensor could also be used as, for example, a temperature sensor (in a constant humidity environment) or a humidity sensor (in a constant temperature environment). Typically, this would involve storing in the control circuitry of the inductive sensor a factory calibration between the measured phase shift $\phi_{RC}$ and the corresponding value of the environmental factor.

In an embodiment of the invention, the described inductive sensor is used to detect remotely the temperature of a liquid within a vessel. In particular, the sensor element 1 is placed within the vessel so that it is immersed in the liquid while the sine coil 7, cosine coil 9 and sense coil 11 are positioned adjacent the exterior of the vessel. The forward and reverse angles are calculated as described, and then added to give a value representative of the phase shift $\phi_{RC}$. The processing unit 53 then accesses a look-up table storing a factory calibration between the measured phase shift $\phi_{RC}$ and temperature, so that a value of the temperature is obtained. It will be appreciated that as the sensor element is immersed in a liquid, it is effectively in a constant humidity environment. It will also be appreciated that an advantage of using an inductive sensor is that there is no requirement to puncture a hole in the vessel to obtain an electrical signal from the sensor element.

Another application of an inductive sensor according to the invention is to detect the humidity in the exhaust of a clothes drier, which is useful to optimise drying cycles.

It will be appreciated that detection of environmental factors can be performed either instead of or in addition to detecting the relative position of two relatively movable members.

In the described embodiment, the sine coil 7 and cosine coil 9 are arranged so that their relative contributions to the total magnetic field component perpendicular to the PCB 5 vary in accordance with position along the measurement direction. In particular, the sine and cosine coils have an alternate twisted loop structure. However, it would be apparent to a person skilled in the art that an enormous variety of different excitation winding geometries could be employed to form transmit aerials which achieve the objective of causing the relative proportions of the first and second transmit signals appearing in the ultimately detected combined signal to depend upon the position of the sensor element in the measurement direction.

While in the described embodiment, the excitation windings are formed by conductive tracks on a printed circuit board, they could also be provided on a different planar substrate or, if sufficiently rigid, could even be free standing. Further, it is not essential that the excitation windings are planar because, for example, cylindrical windings could also be used with the sensor element moving along the cylindrical axis of the cylindrical winding.

If the inductive sensor is used to measure only an environmental factor such as temperature or humidity, only one transmit aerial could be used as there is no requirement for the phase of the magnetic field to vary with position.

In the above described embodiment, a quadrature pair of modulation signals are applied to a carrier signal to generate first and second excitation signals which are applied to the sine coil 7 and cosine coil 9 respectively. However, this is not essential because it is merely required that the information carrying components of the excitation signals are distinct in some way so that the relative contributions from the first and second excitation signals can be derived by processing the combined signal. For example, the modulation signals could have the same frequency and a phase which differs by an amount other than 90 degrees. Alternatively, the modulation signals could have slightly different frequencies thus giving rise to a continuously varying phase difference between the two signals.

In the above described embodiment, a passive resonator is used. However, in some circumstances it may be advantageous to use a powered resonator so that the signal induced in the resonator is considerably amplified, thus reducing the requirements on the signal processing circuitry.

Instead of detecting the phase of the information carrying components of the combined signal, it is also possible to perform parallel synchronous detection of the combined signal, one synchronous detection using an in-phase modulation signal and the other synchronous detection using a quadrature modulation signal, and then to perform an arctangent operation on the ratio of the detected magnitudes of the demodulated signals. In such an embodiment, by using excitation signals which comprise a carrier frequency signal and a modulation signal so that the modulation signals can have a relatively low frequency, the detection of the magnitude of the modulation signals and the ensuing arctangent calculation (or reference to a look-up table) can be performed in the digital domain after down-conversion from the carrier frequency. An alternative method of detection of the information carrying part of the signal after down-conversion from the carrier frequency signal to baseband would be to perform a fast fourier transform detection. As will be appreciated, this could be done either using some additional specialised dedicated hardware (e.g. an application specific integrated circuit) or by suitably programming the microprocessor. Such a method of detection would be particularly convenient in an arrangement in which more than one degree of freedom of movement of a target is to be detected.

In the described embodiment, the inductive sensor is used to measure the linear position of the a first member (i.e. the sensor element 1) relative to a second member (i.e. the PCB 5) in a measurement direction along a straight line. Alternatively, the inductive sensor could be adapted to measure linear position along a curved line, for example a circle (i.e. a rotary position sensor), by varying the layout of the sine coil and the cosine coil in a manner which would be apparent to a person skilled in the art. The inductive sensor could also be used as a speed detector by taking a series of measurements of the position of the first member relative to the second member at known timings. Further, by including additional position sensing devices for sensing the position of the second member relative to a co-ordinate position system (for example, a GPS sensor, an inertial gyroscope, a compass or the like), the position of the first member in the co-ordinate position system can be determined.

In an embodiment, a second pair of excitation windings are formed on the printed circuit board of the described embodiment, the second pair of excitation windings being arranged so that their relative contributions to the total magnetic field vary in accordance with position along a direction perpendicular to the measurement direction of the described embodiment. A second pair of excitation signals are respectively applied to the second pair of excitation windings, with the same carrier frequency but a different modulation frequency being used compared to the first pair of excitation signals applied to the sine coil 7 and cosine coil 9. In such an arrangement, all the pairs of excitation windings are advantageously energised at the same time so as to transmit simultaneously. The combined signal combines all of the transmitted signals into a single signal which can then be processed using a single analogue processing channel.

In particular, the combined single signal can be filtered, amplified and synchronously detected at the carrier frequency using common analogue processing components, so that the resulting demodulated signal contains phase-shifted signals at each of the modulation frequencies. The phase shift of each modulation frequency can then be determined by a set of bandpass filters (either analogue or digital) provided in parallel to isolate each modulation frequency and digital electronics to derive a phase related signal, or by digitising the demodulated signal and using fast fourier transform methods. The fast fourier transform method is particularly simple if the modulation frequencies are all multiples of a common base frequency. The phase shift at each demodulation frequency can be used to determine the position of the first member along the corresponding axis.

In some embodiments, the first member is significantly larger than the resonant circuit. In this case, it can be difficult to identify correctly the movement of the first member. For example, the resonant circuit may move linearly while the movement of the first member includes a rotational component. More precise information about the movement of the first member can be obtained by using two resonator circuits, each having a respective different resonant frequency, attached to respective different positions on the first member. The position of each resonant circuit can be individually measured by tuning the carrier frequency $f_0$ to the resonant frequency for that resonant circuit, and the two positions can be processed to give more precise information on the position and orientation of the first member.

As described above, the inductive sensor can be used to measure environmental parameters in addition to position. In an embodiment, the first sensor includes two co-located resonant circuits having different resonant frequencies, with one resonant circuit including components which are relatively immune to environmental factors so that the resonant frequency is relatively stable, where as the other resonant circuits has a resonant frequency which varies relatively sharply with environmental factors. In this way, by obtaining a position measurement for each resonant circuit without correcting for the phase shift $\phi_{RC}$, the difference in the position measurements can form a measure of an environmental parameter (for example temperature in a constant humidity environment or humidity in a constant temperature environment). Further, it is not essential for the two resonant circuits to be co-located provided their relative positions in the measurement direction or directions is known.

It is preferable that the phase of the carrier signal is identical in all of the transmit coils, as in the above described embodiment, as otherwise a phase shift is induced in the information carrying modulation signal which introduces a phase error and hence a position error (this happens because the gain of the synchronous detector is sensitive to the phase of the carrier signal). It is therefore preferable to use a common carrier signal and to provide similar paths from the signal generator to the coil drivers.

In the above described embodiment, the modulating signals are described as digital representations of sinusoidal signals. This is not strictly necessary and it is often convenient to use modulating signals that can be more easily generated using simple electronics. For example, the modulating signals could be digital representations of triangular waveforms. The phase of the modulation can be decoded in the usual way by only looking at the fundamental frequency of the modulated signals, i.e. by filtering out the higher harmonics present in the triangular waveform. Note that some filtering will be performed as a result of the physical and electrical properties of, and the electromagnetic coupling between, the transmit and receive aerials. Alternatively, if no filtering is used, the zero crossing point of the demodulated waveform will still vary with the target position in some predictable, albeit non-linear, manner which could be converted to a linear measurement of position by using look-up table or a similar technique.

In order to minimise susceptibility to unwanted noise derived from, for example, an external device, one or more additional sense coils may be added to the basic structure of the receive aerial in order to balance the first sense coil. Such additional coils are preferably displaced in a direction transverse to the measurement path such that the signal received by the sense coils does not vary with the relative position of the two moveable members. However, because the detected signal is a combined signal in which only the phase information is required, it is not essential for this to be the case.

In the above described embodiment, the measurement path extends only over a single period of the spatial variation of the two transmit coils (i.e the sine coil 7 and the cosine coil 9). However, this need not be the case and the measurement path could extend over more or less than a single period of the spatial variation of the transmit coils. In such a case, it is preferable to include a mechanism for resolving period ambiguity (i.e. the fact that the basic phase of the information carrying component of the combined signal will be identical for the same corresponding position in different spatial periods of the transmit coils). Mechanisms for overcoming spatial period ambiguity which can be employed include providing a single reference position detected, for example, by a single location position sensor (e.g. by having a single localised transmit coil transmitting a third transmit signal at a different modulation frequency to add with the first and second transmit aerials, or by using an opto-switch) and thereafter counting the periods from the reference position, and maintaining a record in a register within the microprocessor of the particular period within which the sensor element is currently located. Alternatively, an additional set of transmit coils transmitting at a different modulation frequency (or transmitting in a time multiplexed manner), could be used with either a slightly varying spatial frequency to provide a vernier scale effect, or with a widely varying spatial frequency to provide coarse position detection using a large scale set of transmit coils and fine scale position detection using small scale transmission coils.

In the described embodiment, a single resonant circuit is formed on the sensor element 1, and the orientation of the sensor element 1 relative to the sine coil 7, cosine coil 9 and sense coil 11 is fixed. A particular orientation is not essential, although it is preferred that the orientation is fixed or known for consistency of measurement.

In some applications it is desirable not to introduce any constraint on the orientation of the sensor element 1. For example, for a liquid level sensor in which the sensor element floats on top of a liquid (e.g. a liquid level sensor in a container storing detergent or the like), if a constraint is placed on the movement of the sensor element, then the sensor element may become stuck after prolonged use so that it does not provide a true representation of the liquid level. In such an application, preferably the sensor element floats freely on top of the liquid and the sensor element comprises multiple resonant circuits at respective different orientations so that the position of the sensor element can be detected regardless of its orientation. If desired, the resonant frequency for each of the resonant circuits can be made different so that the orientation of the sensor element can also be detected by scanning through all the possible resonant frequencies and measuring the strengths of the received signals.

An advantage of the described embodiment is that the digital processing required to determine the position of the sensing element is so straightforward that it can be performed by a short piece of code run by a conventional microprocessor chip. It is therefore not necessary to develop an application specific integrated circuit (ASIC), which is a notoriously difficult and time consuming task. It will be appreciated that a dedicated microprocessor is not required, so that a microprocessor which performs additional functions, for example controlling a domestic appliance, could be used.

In the described embodiment, a modulation frequency of 3.9 khz is used because it is well suited to digital processing techniques. This generally applies to frequencies in the range 100 Hz to 100 kHz.

In the described embodiment, a carrier frequency of 2 MHz is used. Using a carrier frequency above 1 MHz facilitates making the sensor element small. However, in some applications it may be desirable to use a carrier frequency below 100 kHz, for example if a sheet of non-metallic stainless steel separates the sensor element from the excitation and sensor windings, because the skin depth of the non-magnetic stainless steel is greater at lower frequencies.

In the described embodiment, the excitation windings (i.e. the sine coil 7 and the cosine coil 9) are electromagnetically coupled to the sensor winding (i.e. the sense coil 11) via a resonant circuit. Alternatively, the excitation windings could be coupled to the sensor winding via a permeable element or a harmonic element (such as a magneto-restrictive element which generates signals at harmonics of an excitation signal). Further, it is not essential to use an intermediate coupling component between the excitation and sensor windings as either the sensor winding or the excitation winding could be formed on the sensor element, although this is not preferred because it would require electrical connections to be made to the sensor element. In an embodiment, the sensor winding forms part of a resonant circuit on the sensor element.

The invention claimed is:

1. A sensor for sensing a parameter and for providing a value representative of the parameter being sensed, the sensor comprising:
    an excitation winding;
    a resonator;
    a sensor winding electromagnetically coupled to the excitation winding via the resonator;
    a signal generator operable to generate an excitation signal and arranged to apply the generated excitation signal to the excitation winding in order to generate a periodic electric signal in the sensor winding indicative of the value of the parameter to be measured by the sensor, wherein the excitation signal comprises a periodic carrier signal having a first frequency, which is operable to induce a resonant signal in the resonator, modulated by a periodic modulation signal having a second frequency, the first frequency being greater than the second frequency;
    a demodulator operable to demodulate the electric signal generated in the sensor winding to obtain a signal at the second frequency; and
    a signal processor operable to process said signal at the second frequency to determine a value representative of the parameter being measured.

2. A sensor for sensing a parameter and providing a value representative of the parameter being sensed, the sensor comprising:
    an excitation winding;
    a sensor winding electromagnetically coupled to the excitation winding, the sensor winding forming part of a resonator;
    a signal generator operable to generate an excitation signal and arranged to apply the generated excitation signal to the excitation winding in order to generate a periodic electric signal in the sensor winding indicative of the value of the parameter to be measured by the sensor, wherein the excitation signal comprises a periodic carrier signal having a first frequency, which is operable to induce a resonant signal in the resonator, modulated by a periodic modulation signal having a second frequency, the first frequency being greater than the second frequency;
    a demodulator operable to demodulate the electric signal generated in the sensor winding to obtain a signal at the second frequency; and
    a signal processor operable to process said signal at the second frequency to determine the value representative of the parameter being measured.

3. A sensor according to claim 1 or claim 2, wherein the excitation winding is formed by a conductive track on a planar substrate.

4. A sensor according to claim 3, wherein the planar substrate is a printed circuit board.

5. A sensor according to claim 3, wherein the excitation winding effectively comprises a plurality of loops arranged so that current flowing through the excitation winding flows around at least one of the loops in an opposite direction to at least one other of the loops.

6. A sensor according to claim 1 or claim 2, wherein the signal generator comprises a digital carrier signal generator operable to generate a digital carrier signal at the first frequency.

7. A sensor according to claim 6, wherein the digital carrier signal generator is arranged to generate the digital carrier signal with a square waveform.

8. A sensor according to claim 1 or claim 2, wherein the signal generator comprises a digital modulation signal generator operable to generate a digital modulation signal at the second frequency.

9. A sensor according to claim 8, wherein the digital modulation signal generator is arranged to generate the digital modulation signal with a pulse width modulation type waveform forming a digital representation of a sinusoidal wave.

10. A sensor according to claim 8, wherein the digital carrier signal generator is arranged to generate the digital carrier signal with a square waveform, and
    wherein the signal generator comprises a digital mixer arranged to mix the digital carrier signal and the digital modulation signal to generate a digital excitation signal.

11. A sensor according to claim 10, wherein the signal generator further comprises analogue driving circuitry for generating the excitation signal in accordance with the digital excitation signal output by the digital mixer.

12. A sensor according to claim 1 or claim 2, wherein said second frequency is in the range 100 Hz to 100 kHz.

13. A sensor according to claim 1 or claim 2, wherein said first frequency is above 1 MHz.

14. A sensor according to claim 1 or claim 2, wherein said first frequency is less than 100 kHz.

15. A sensor according to claim 1 or claim 2, wherein the signal processor is arranged to determine a phase shift associated with the resonator, the phase shift varying in accordance with an environmental factor, and wherein the sensor further comprises means for storing calibration data for converting the determined phase shift into a measurement value for the environmental factor.

16. A sensor according to claim 15, wherein the environmental factor is temperature.

17. A sensor according to claim 15, wherein the environmental factor is humidity.

18. A sensor according to claim 1 or claim 2, wherein said resonator comprises a passive resonant circuit.

19. A sensor according to claim 1 or claim 2, wherein said resonator comprises an amplifier for amplifying the power of a signal induced in the resonator.

20. A sensor according to claim 1 or claim 2, wherein the sensor winding is formed by a conductive track on a planar substrate.

21. A sensor according to claim 20, wherein the sensor winding is formed on a printed circuit board.

22. A sensor according to claim 20, wherein the sensor winding is formed in a single loop.

23. A sensor according to claim 1 or claim 2, wherein the signal processor is operable to measure the timing of said signal at the second frequency output by the demodulator in order to determine a value representative of the parameter being measured.

24. A sensor according to claim 1 or claim 2, wherein the demodulator comprises:
 a cross-over switch arranged to be switched at the first frequency in order to rectify the signal generated in the sensor winding; and
 a filter operable to filter the rectified signal output by the cross-over switch.

25. A sensor according to claim 24, wherein the filtering means comprises a band-pass filter at the second frequency.

26. A sensor according to claim 1 or claim 2, wherein the signal processor further comprises a comparator arranged to compare the signal at the second frequency output by the demodulator with a reference voltage in order to generate a square wave signal.

27. A sensor according to claim 26, wherein the signal processor further comprises a digital signal processor operable to process the recovered signal at the second frequency to determine the value of the parameter being measured.

28. A sensor according to claim 27, wherein the digital signal processor further comprises
 a pulse stream generator operable to generate a stream of pulses;
 a gate arranged to receive the stream of pulses output by the pulse stream generator and the square wave signal output by the comparator, wherein the gate is operable to either pass or block the received stream of pulses in accordance with said received square wave signal;
 a counter operable to count the number of pulses of the pulse stream passed by the digital gate; and
 a value determiner operable to determine a value representative of the parameter being measured from the number of pulses counted by the counter.

29. A sensor according to claim 28, wherein the value determiner is operable to identify the timings, relative to a reference signal at the second frequency, of at least one of the first pulse and the last pulse of a sequence of pulses received by the counter in order to determine the timing of the signal generated in the sensor winding.

30. A sensor according to claim 29, wherein the signal output by the demodulator has an average voltage level, wherein the comparator is arranged to compare the signal output by the demodulator with a reference voltage which is away from said reference voltage level, and wherein the value determiner is operable to identify the timings, relative to the reference signal at the second frequency, of both the first pulse and the last pulse of a sequence of pulses received by the counter in order to determine the timing of the midpoint of the sequence of pulses.

31. A sensor according to claim 2, in which the excitation winding is a first excitation winding and is fixed to a first member, the sensor winding is fixed to a second member which is movable relative to the first member, and the sensor further comprises a second excitation winding which is fixed to the first member and is electromagnetically coupled to the sensor winding,
 wherein the first excitation winding and the sensor winding are arranged so that the electromagnetic coupling between the first excitation winding and the sensor winding varies in accordance with the relative position along a measurement direction between the first and second members according to a first function,
 wherein the second excitation winding and the sensor winding are arranged so that the electromagnetic coupling between the second excitation winding and the sensor winding varies in accordance with the relative position along the measurement direction between the first and second members according to a second function which is different to the first function,
 wherein the excitation signal applied to the first excitation winding is a first excitation signal and wherein the signal generator is operable to generate a second excitation signal which is applied to the second excitation winding, the second excitation signal comprising a second periodic carrier signal at the first frequency modulated by a second periodic modulation signal at the second frequency,
 wherein in response to the first excitation signal being applied to the first excitation winding and the second excitation signal being applied to the second excitation winding, the periodic electric signal generated in the sensor winding has a timing which varies in dependence upon the relative position along the measurement direction of the first and second members, and
 wherein the signal processor is operable to measure the timing of the electric signal output by the demodulator to determine a value representative of the relative position along the measurement direction of the first and second members.

32. A sensor according to claim 31, wherein the second member comprises a plurality of sensor windings having respective different orientations.

33. A sensor according to claim 1, in which the excitation winding is a first excitation winding and the sensor further comprises a second excitation winding, the first and second excitation windings and the sensor winding being fixed relative to a first member,
 wherein the resonator is fixed relative to a second member, the first and second members being moveable relative to each other along a measurement direction,
 wherein the first and second excitation windings are electromagnetically coupled to the sensor winding via the resonator such that the electromagnetic coupling between the first and second excitation windings and the sensor winding varies with the relative positions of the first and second members along the measurement direction in accordance with respective different functions,
 wherein the excitation signal applied to the first excitation winding is a first excitation signal and wherein the signal generator is operable to generate a second excitation signal which is applied to the second excitation winding, the second excitation signal comprising a second periodic carrier signal at the first frequency modulated by a second periodic modulation signal at the second frequency, wherein in response to the first excitation signal being applied to the first excitation winding and the second excitation signal being applied to the second excitation winding, the periodic electric signal generated in the sensor winding has a timing which varies in dependence upon the relative position along the measurement direction of the first and second members, and wherein the signal processor is operable to measure the timing of the periodic electric signal output by the demodulator to determine a value representative of the relative position along the measurement direction of the first and second members.

34. A sensor according to claim 33, wherein a plurality of resonators are fixed relative to the second member, each of the plurality of resonators having a respective different orientation.

35. A sensor according to claim 34, wherein the plurality of resonators have respective different resonant frequencies.

36. A sensor according to claim 31 or claim 33, wherein the first and second excitation windings and the sensor winding are arranged so that said first and second functions vary sinusoidally with position with the same period but are out of phase with each other.

37. A sensor according to claim 36, wherein the first and second functions are one quarter of a cycle out of phase with each other.

38. A sensor according to claim 31 or claim 33, wherein the second periodic modulation signal has the same waveform, but is out of phase with, the first periodic modulation signal.

39. A sensor according to claim 38, wherein the second periodic modulation signal is one quarter of a cycle out of phase with the first periodic modulation signal.

40. A sensor according to claim 31 or claim 33, wherein the sensor is arranged to determine a first timing measurement when applying the first and second excitation signals, and to obtain a second timing measurement when applying the first excitation signal to said first excitation winding and a third excitation signal to said second excitation winding, the third excitation signal comprising a third periodic carrier signal at the first frequency modulated by a third periodic modulation signal at the second frequency, wherein the third periodic modulation signal is in anti-phase with said second periodic modulation signal, and wherein the signal processor is arranged to determine a position value using the first and second timing measurements.

41. A sensor according to claim 31 or claim 33, wherein the first and second members are relatively movable along a linear direction.

42. A position sensor comprising:

first and second members which are movable relative to each other along a measurement direction, the first member comprising first and second excitation windings and a sensor winding, and the second member comprising a resonator having a resonant frequency, wherein the electromagnetic coupling between the first excitation winding and the resonator varies with the relative position along the measurement direction of the first and second members in accordance with a first function and the electromagnetic coupling between the second excitation winding and the resonator varies with the relative position along the measurement direction of the first and second members in accordance with a second function different from the first function;

an excitation circuit operable to generate first and second excitation signals and to apply the first and second excitation signals to the first and second excitation windings respectively, wherein in response to the first and second excitation signals being applied to said first and second excitation windings, there is generated in the sensor winding an electric signal corresponding to a combination of the first and second excitation signals weighted in accordance with the relative position of the first and second members along the measurement direction; and a signal processor operable to process the electric signal generated in the sensor winding to determine a value representative of the relative position along the measurement direction of the first and second members, wherein the first and second excitation signals comprise respective periodic carrier signals at a carrier frequency respectively modulated by first and second periodic modulation signals at a modulation frequency which is less than the carrier frequency, wherein the carrier frequency is substantially equal to the resonant frequency of the resonator, and wherein the first and second modulation signals have respective different phases.

43. A method of sensing a parameter, the method comprising:

applying an excitation signal to an excitation winding, thereby generating a signal in a sensor winding which is electromagnetically coupled to the excitation winding via a resonator; and processing said signal generated in the sensor winding to determine a value representative of the parameter being measured, wherein said exciting step comprises applying to the excitation winding a periodic carrier signal having a first frequency, which is operable to induce a resonant signal in the resonator, modulated by a periodic modulation signal having a second frequency, the first fiequency being greater than the second frequency, and wherein said processing step comprises demodulating the signal generated in the sensor winding to recover a signal at the second frequency.

* * * * *